United States Patent
Peterson et al.

(10) Patent No.: US 8,933,140 B2
(45) Date of Patent: Jan. 13, 2015

(54) THERMAL STORAGE GELATINOUS TRIBLOCK COPOLYMER ELASTOMER PARTICLES IN POLYURETHANE FLEXIBLE FOAMS

(71) Applicant: Peterson Chemical Technology, Inc., Fort Smith, AR (US)

(72) Inventors: Bruce W. Peterson, Fort Smith, AR (US); Mark L. Crawford, Rudy, AR (US)

(73) Assignee: Peterson Chemical Technology, Inc., Fort Smith, AR (US)

( * ) Notice: Subject to any disclaimer, the term of this patent is extended or adjusted under 35 U.S.C. 154(b) by 0 days.

(21) Appl. No.: 13/932,492

(22) Filed: Jul. 1, 2013

(65) Prior Publication Data
US 2013/0295371 A1 Nov. 7, 2013

Related U.S. Application Data

(63) Continuation-in-part of application No. 12/713,586, filed on Feb. 26, 2010.

(60) Provisional application No. 61/667,810, filed on Jul. 3, 2012.

(51) Int. Cl.
C08G 18/06 (2006.01)
C08J 9/00 (2006.01)
C08G 101/00 (2006.01)

(52) U.S. Cl.
CPC ............... *C08J 9/009* (2013.01); *C08J 9/0014* (2013.01); *C08J 2205/05* (2013.01); *C08G 2101/0008* (2013.01)
USPC ................. 521/137; 521/65; 521/69; 521/70; 521/71; 521/99; 521/134; 521/139; 521/170

(58) Field of Classification Search
CPC ............... C08J 2205/05; C08J 2375/04; C08J 2409/06; C08J 9/0009; C08J 9/0014; C08J 9/405; C08J 9/42; C08J 9/04; C08G 2101/0008
USPC ........... 521/65, 69, 70, 71, 99, 134, 137, 139, 521/170
See application file for complete search history.

(56) References Cited

U.S. PATENT DOCUMENTS

| | | | |
|---|---|---|---|
| 3,255,128 A | 6/1966 | Farkas et al. | |
| 3,833,951 A | 9/1974 | Hurwitz | |
| 3,925,266 A * | 12/1975 | Fabris et al. | 521/126 |
| 4,756,958 A | 7/1988 | Bryant et al. | |
| 4,776,356 A * | 10/1988 | Jou et al. | 15/244.4 |
| 4,807,696 A | 2/1989 | Colvin et al. | |
| 5,366,801 A | 11/1994 | Bryant et al. | |
| 5,499,460 A | 3/1996 | Bryant et al. | |
| 5,637,389 A | 6/1997 | Colvin et al. | |
| 5,722,482 A | 3/1998 | Buckley | |
| 5,804,297 A | 9/1998 | Colvin et al. | |
| 5,955,188 A | 9/1999 | Pushaw | |
| 6,004,662 A | 12/1999 | Buckley | |
| 6,048,810 A | 4/2000 | Baychar | |
| 6,051,624 A * | 4/2000 | Bastin et al. | 521/174 |
| 6,063,825 A * | 5/2000 | Isobe et al. | 521/137 |
| 6,183,855 B1 | 2/2001 | Buckley | |
| 6,265,457 B1 | 7/2001 | Dolgopolsky et al. | |
| 6,319,599 B1 | 11/2001 | Buckley | |
| 6,387,973 B1 | 5/2002 | Saleh et al. | |
| 6,765,031 B2 * | 7/2004 | Salyer et al. | 521/99 |
| 6,772,825 B2 | 8/2004 | Lachenbruch et al. | |
| 6,855,410 B2 | 2/2005 | Buckley | |
| 7,793,372 B2 | 9/2010 | Lean et al. | |
| 2003/0088019 A1 | 5/2003 | Pause et al. | |
| 2003/0220432 A1 | 11/2003 | Miller et al. | |
| 2004/0097608 A1* | 5/2004 | Re'em | 521/170 |
| 2004/0192795 A1* | 9/2004 | Chevalier et al. | 521/137 |
| 2004/0204511 A1* | 10/2004 | Tokuyasu et al. | 521/85 |
| 2005/0208286 A1 | 9/2005 | Hartmann et al. | |

FOREIGN PATENT DOCUMENTS

| | | |
|---|---|---|
| KR | 10-2004-0041255 A | 5/2004 |
| WO | 2005-097935 A1 | 10/2005 |
| WO | 2010-129647 A1 | 11/2010 |
| WO | 2011-069928 A2 | 6/2011 |

\* cited by examiner

*Primary Examiner* — John Cooney
(74) *Attorney, Agent, or Firm* — Mossman Kumar & Tyler PC

(57) ABSTRACT

Combinations of gelatinous elastomer containing one or more phase change materials, known as "phase change gel", and polyurethane foam may be made by introducing at least partially cured phase change gel particles comprising plasticized triblock copolymer resin and/or diblock copolymer resin and one or more phase change materials, into a mixture of polyurethane foam-forming components including a polyol and an isocyanate. The phase change gel can be crosslinked to form a cured gelatinous gel, which is then reduced in size before introduction. After the foam-forming components polymerize to make polyurethane foam, the phase change gel particles are discrete visible particles dispersed throughout the foam. The polyurethane reaction is exothermic and can generate sufficient temperature to at least partially melt the styrene-portion of the triblock copolymer resin thereby extending the crosslinking. The combination of phase change gel and polyurethane foam increases the heat storage capacity and thermal conductivity of the foam.

42 Claims, 8 Drawing Sheets

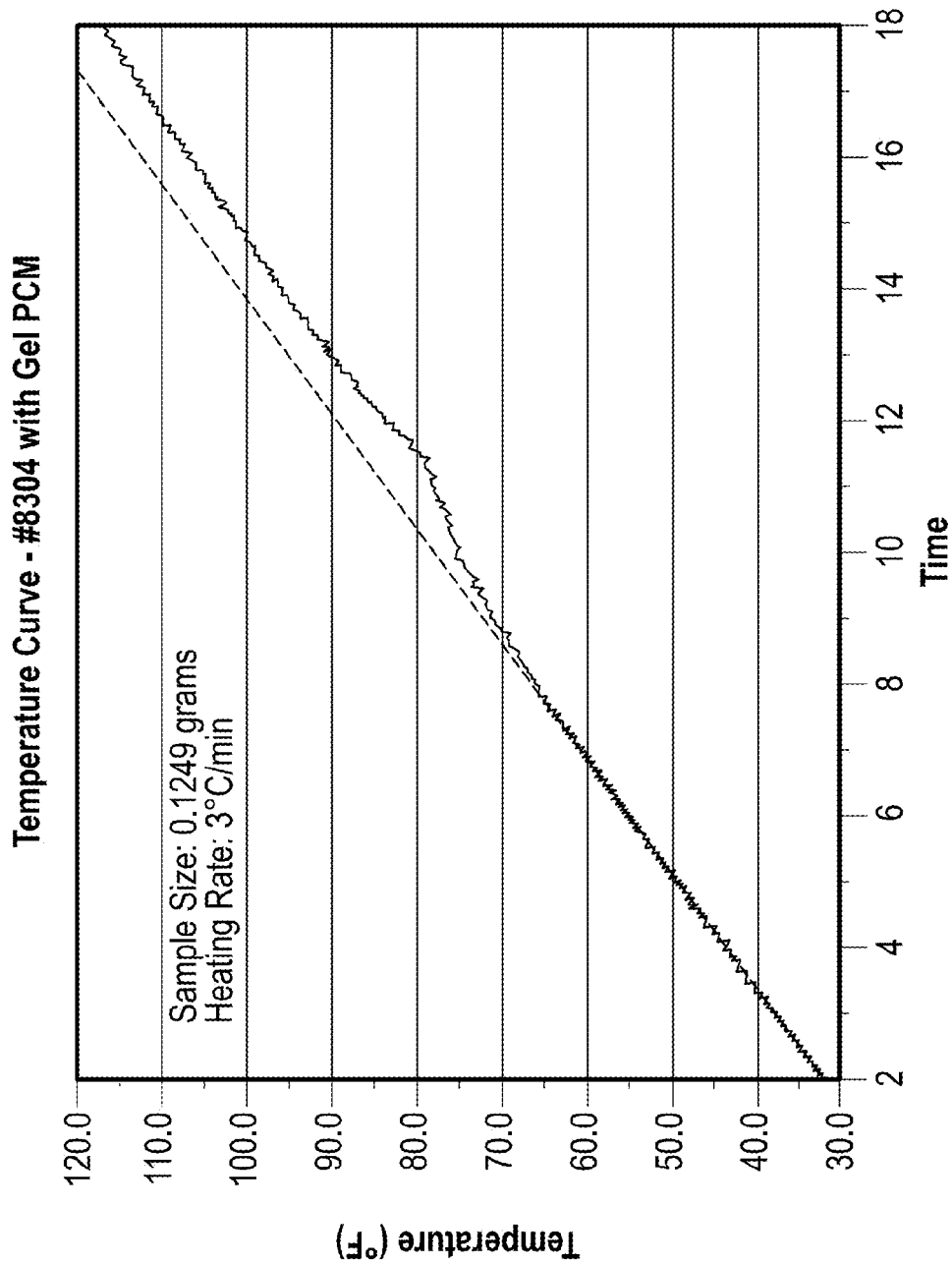

THERMAL STORAGE GELATINOUS TRIBLOCK COPOLYMER ELASTOMER PARTICLES IN POLYURETHANE FLEXIBLE FOAMS

CROSS-REFERENCES TO RELATED APPLICATIONS

This application claims the benefit of U.S. Provisional Patent Application 61/667,810 filed Jul. 3, 2012, and is a continuation-in-part of U.S. Ser. No. 12/713,586 filed Feb. 26, 2010, both of which are incorporated herein by reference in their entirety.

TECHNICAL FIELD

The invention relates to methods for making and using gel polymer as a carrier, sequestering agent, and/or an encapsulant for phase change materials, otherwise known as PCMs. The gel polymers containing one or more phase change materials (hereafter referred to as "phase change gel"), will be used within polyether polyurethane foams, polyester polyurethane flexible foams or latex foams and relate to foams so made, and more particularly relate to gel polymers containing one or more phase change materials in polyether or polyester polyurethane flexible foams or latex foams and methods for making these materials. The invention more specifically relates to mattresses, pillows, bedding products, furniture upholstery, carpet pads, floor mats, bath mats, pet beds, shoe inserts, medical cushioning foams, seat cushions and backs, automotive foam, sports cushioning, transportation cushioning, headrests, arm rests and the like.

TECHNICAL BACKGROUND

Flexible polyurethane foam is commonly produced by methods of molding and free-rise. The process of molding polyurethane flexible foam involves introducing chemicals required for making foam (in one non-limiting embodiment, one or more polyols, one or more isocyanates and one or more additives) in the desired ratio by injection or open pour into an individual, multiple or continuous mold and allowing the reacting foam system to fill the mold(s). There are many types of free-rise foam machines. Examples of these include, but are not necessarily limited to, Open-Box Pouring Machines and Continuous Foam Machines such as Direct Lay-Down Machines and Maxfoam Process Machines. In a Continuous Direct Lay-Down foam process, chemicals are metered and mixed through a mix-head and applied to a conveyed paper or film, upon which the foam chemicals react and rise as the mix is carried away from the lay-down area.

It is also well known to make gelatinous elastomer materials from KRATON®, SEPTON®, or CALPRENE® triblock copolymer elastomers that have been plasticized with mineral oils or other non-aromatic oils. Gelatinous triblock copolymer elastomers have been produced as articles and used in conjunction with prior and separately manufactured polyurethane or polyester foams, for instance as separate, discrete layers.

It is also helpful and desirable to develop new, alternative and/or improved foams and methods for making the polyurethane flexible foams that have combined and/or improved properties.

SUMMARY

There is provided, in one non-limiting embodiment, a composition comprising a combination of phase change gel and polyurethane foam. The combination is produced by the method involving at least partially melting a plasticized copolymer resin, mixing in one or more phase change materials and optional additives such as thermally-conductive materials, and crosslinking the gel copolymer resin, to give a cured phase change gel, wherein the copolymer resin may be a triblock copolymer resin and/or diblock copolymer resin, and combinations thereof. Cured phase change gel particles are defined herein as particles that are sufficiently crosslinked such that they have elastomeric properties below their melt temperature. The method further involves reducing the size of the cured phase change gel into particles having an average particle size between the range of about 0.01 to 10 millimeters. Additionally, the method includes introducing the phase change gel particles into a mixture of polyurethane foam-forming components which include a polyol and an isocyanate. The phase change gel particles may be added in the range of about 0.1 to about 200 parts per hundred of the polyol component of polyurethane foam. The method also involves polymerizing the polyol and isocyanate to form a polyurethane foam. After the foam-forming components polymerize to make polyurethane foam, the phase change gel particles are particles dispersed throughout the entire polyurethane foam.

In a different non-restrictive version, there is provided a composition comprising combination of phase change gel and open cell flexible polyurethane foam including cured phase change gel particles made by a method comprising at least partially melting a plasticized copolymer resin, mixing in one or more phase change materials and optional additives such as thermally-conductive materials, and crosslinking the gel copolymer resin to give a cured phase change gel, wherein the copolymer resin may be a triblock copolymer resin, a diblock copolymer resin, and combinations thereof. The phase change gel particles have an average particle size between the range of about 0.01 to 10 millimeters within an open cell flexible polyurethane foam. After the foam-forming components polymerize to make polyurethane foam, the phase change gel particles are particles dispersed throughout the entire polyurethane foam. The phase change gel particles are present in the range of 0.1 to about 200 parts per hundred of the polyol component of open cell flexible polyurethane foam.

In a different non-restrictive version, there is provided a composition comprising a combination of phase change gel and latex foam including cured phase change gel particles made by a method comprising at least partially melting a plasticized copolymer resin, mixing in one or more phase change materials and optional additives such as thermally-conductive materials, and crosslinking the gel copolymer resin to give a cured phase change gel, wherein the copolymer resin may be a triblock copolymer resin, a diblock copolymer resin, and combinations thereof. The phase change gel particles have an average particle size between the range of about 0.01 to 10 millimeters within a latex foam. The phase change gel particles are present in the range of 0.1 to about 200 parts per hundred of the latex foam forming components of the latex foam. After the latex-forming components polymerize to make latex foam, the phase change gel particles are particles dispersed throughout the entire latex foam.

There is also provided, in a non-restrictive embodiment, articles of the compositions comprising the combinations of phase change gel particles having an average particle size between the range of about 0.01 to 10 millimeters within an open cell polyurethane foam or latex foam made as described above. In the open cell polyurethane foam or latex foam, the phase change gel particles are discrete visible particles dispersed throughout the entire foam article. Articles may be manufactured from these combinations of phase change gel and open cell polyurethane foam or latex foam including, but not necessarily limited to, mattresses, pillows, bedding products, rebond carpet pads, floor mats, bath mats, pet beds, shoe inserts, medical cushioning foams (e.g. wheelchair pads, medical bedding and gurney pads), pillows, seat cushions, seat backs, head rests, armrests, sports equipment, upholstered products, and combinations thereof.

BRIEF DESCRIPTION OF THE DRAWINGS

FIG. 6 is a graph of temperature change of a foam sample with phase change gel over time;

FIG. 7 is a schematic illustration of a phase change gel particle, where

Figure 1:
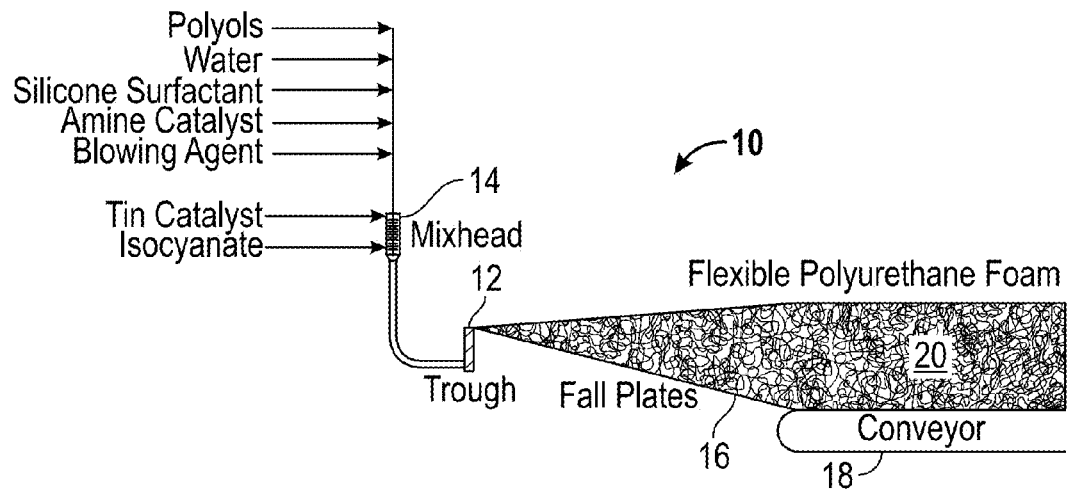
FIG. 1 is a schematic illustration of a continuous, free-rise polyurethane foam processing apparatus.

It will be appreciated that FIGS. 1-4, 7, and 9-14 are schematic and that the various elements are not necessarily to scale or proportion, and that many details have been removed or simplified for clarity, and thus the invention is not necessarily limited to the embodiments depicted in the Figures.

DETAILED DESCRIPTION

It has been discovered that in-situ incorporation of plasticized gelatinous triblock and/or diblock copolymer elastomer particles containing one or more phase change materials (referred to as "phase change gel") into open cell, flexible polyether or polyester polyurethane foam may be conducted while the foam is being produced. That is, the phase change gel particles are incorporated in the polyurethane foam in-situ during the foaming reaction using the exothermic heat of the foam reaction. The exothermic heat of the polyurethane foam reaction softens or melts the phase change gel particles and forms new crosslinking of the phase change gel particles which result in physical attachment and overall integration of the polyurethane foam with the phase change gel. The phase change gel particles may be discrete visible particles dispersed throughout the entire foam. Gelatinous triblock copolymer elastomers have been produced as articles and used in conjunction with a prior and separately manufactured polyurethane or polyester foam as discrete, relatively large-scale components or layers, but the methods and items made herein relate to incorporating the phase change gel directly into the polyurethane foam structure while the polyurethane foam is produced.

The reaction of the polyol/water and isocyanate to form polyurethane foam is exothermic, and the heat from this exothermic reaction at least partially melts the triblock copolymer resin. In one acceptable, non-limiting embodiment, the phase change gel is essentially completely polymerized prior to size reduction and incorporation into the mixture of open cell, flexible polyurethane foam-forming components, such as a mixture of at least one polyol and at least one isocyanate. The resulting combination may have a marbled, mottled or spotted appearance of the phase change gel within the polyurethane foam.

In another non-limiting embodiment, the phase change gel particles are added in the range of about 0.1 to about 200 parts per hundred parts of the polyol component of polyurethane foam. In an alternative, non-restrictive version, the phase change gel particles are added in the range of about 5 independently to about 60 parts per hundred of the polyol component of polyurethane foam. By independently is meant that any lower threshold may be combined with any upper threshold for an effective range herein. Further, the phase change gel particles may be added in the range of about 30 parts per hundred of the polyol component.

Addition of phase change gel to open cell flexible polyurethane foam changes the temperature properties of the combination with the foam in a measurable way. Phase change materials undergo an enthalpy or energy change due to heat of fusion around its melting point. Combining phase change materials with open cell flexible polyurethane foam has the potential for a higher heat capacity than using open cell flexible polyurethane foam alone; however, incorporation of phase change materials in polyurethane foam tend to have low thermal conductivities similar to polyurethane foam. Gel has thermally-conductive properties superior to polyurethane foam. By incorporating phase change materials into a gel to make a phase change gel, and incorporating said phase change gel within open cell flexible polyurethane foam, the combined desirable effect of increasing thermal conductivity and thermal storage capacity is achieved. When such a combination is used in bedding materials, such as mattresses and pillows, the two features combine to promote greater heat transfer and more comfortable sleep.

Figure 7A:
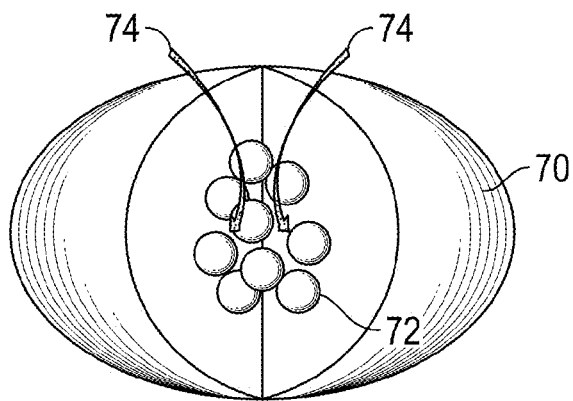
FIG. 7A is a schematic illustration of a phase change gel bead absorbing heat.
Figure 7B:
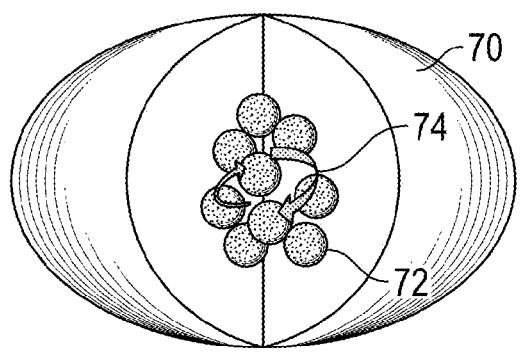
FIG. 7B is a schematic illustration of a phase change gel bead where the phase change material has melted from the solid form and FIG. 7C is a schematic illustration of a phase change gel bead.
Figure 7C:
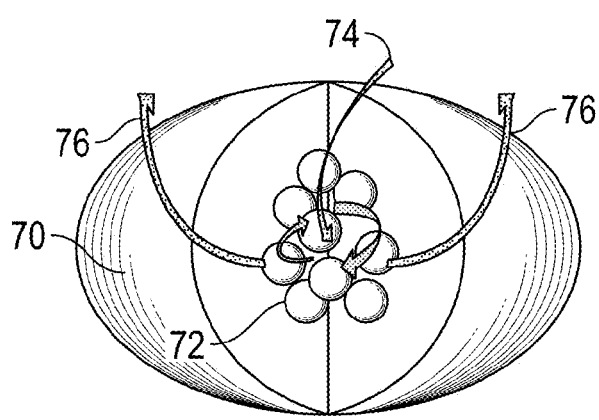
Figure 8:
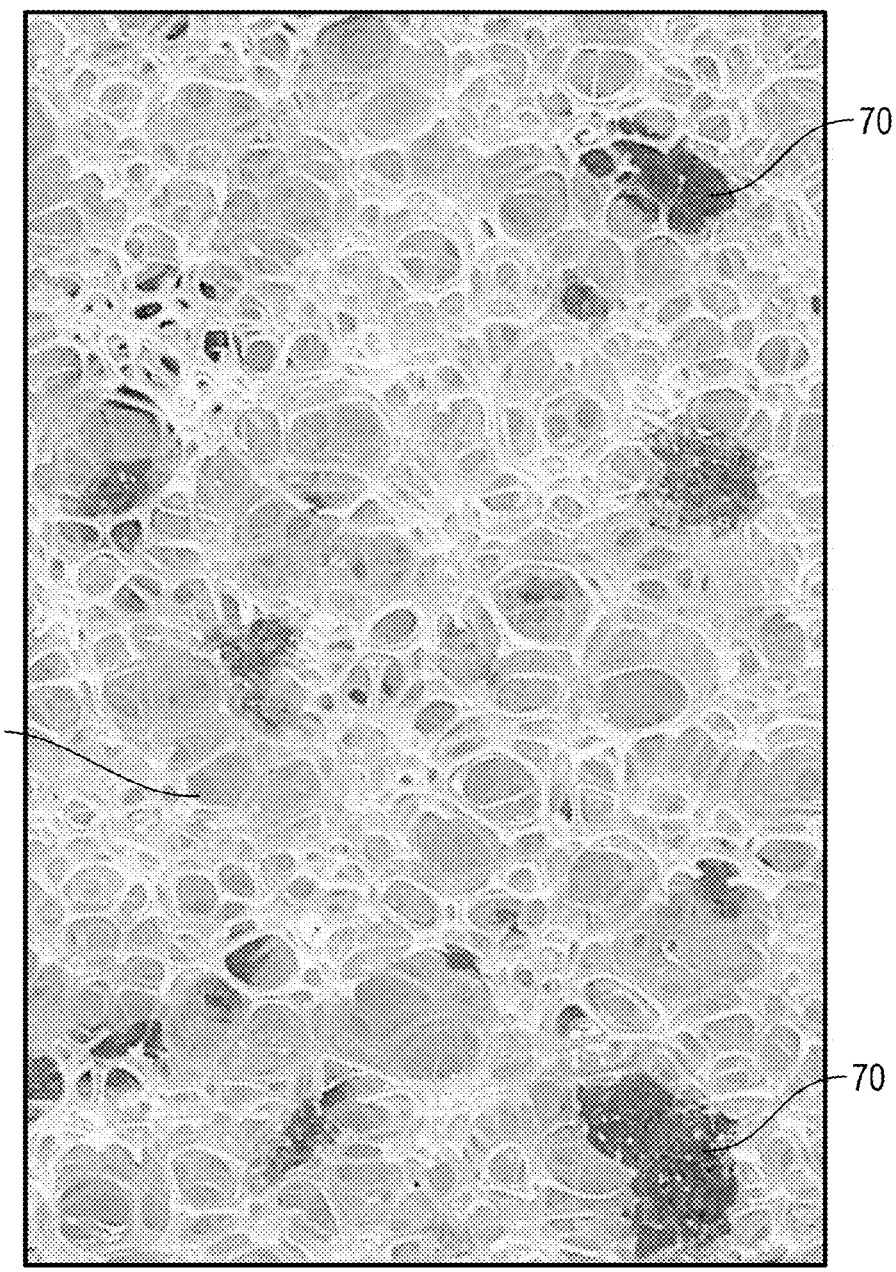
FIG. 8 is a photomicrograph of gel-infused viscoelastic foam.

The combination of gel particles and phase change materials can be arranged so one or more phase materials are located on the inside of the gel particle. In one non-limiting embodiment, a phase change gel particle can be constructed such that the phase change component is at the center core of the particle and surrounded by gel. An example of a phase change gel particle is shown in FIG. 7 where 70 is a gel particle having multiple solid (white) phase change materials 72 therein. When the phase change materials 72 absorb heat as shown by dark gray arrows 74 (FIG. 7A), the phase change materials 72 melt and become liquid (shown as light gray in FIG. 7B). The phase change materials 72 inside gel particle 70 thus absorb heat and cool the surrounding environment (lighter gray arrows 76). Shown in FIG. 8 is a photomicrograph of gel particles 70 in a polyurethane foam matrix 78. Alternatively, one or more phase change materials may be homogeneously or heterogeneously dispersed throughout the entire gel particle. Alternatively, one or more phase change materials may be attached, grafted, or bound to at least part of or all of the outer surface of the gel particle.

Figure 9:
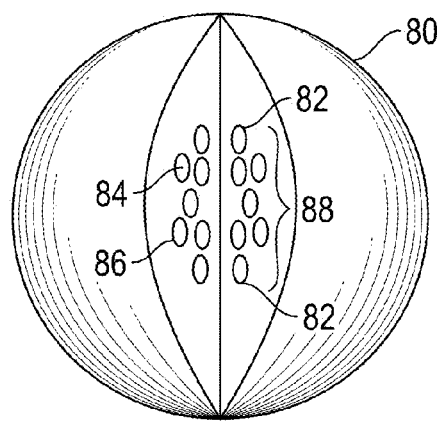
FIG. 9 is a schematic, partial sectional illustration of an encapsulated phase change material (PCM) that is in turn encapsulated or contained at or near the center of a gel particle.
Figure 10:
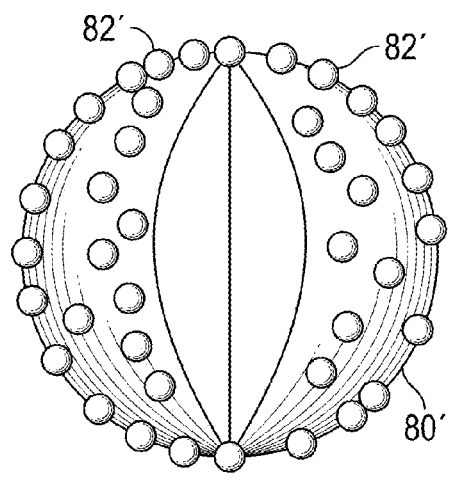
FIG. 10 is a schematic, partial sectional illustration of encapsulated PCMs bound to or on the outside of a gel particle.
Figure 11:
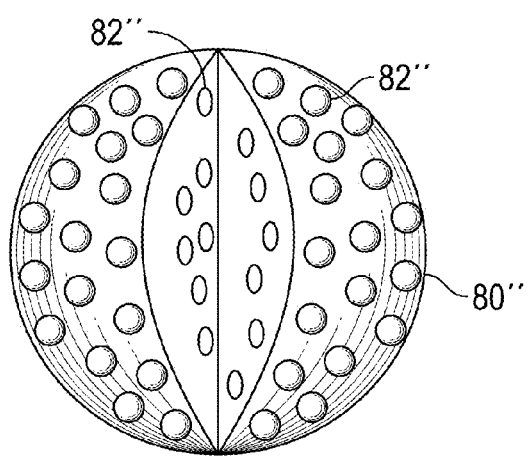
FIG. 11 is a schematic, partial sectional illustration of a gel particle having encapsulated PCMs dispersed generally homogeneously on and within the gel particle.

Shown in FIGS. 9-14 are schematic, partial, sectional illustrations of various non-limiting embodiments schematically showing the physical structure of phase change material (PCM) in relation to the gel particles which may occur when PCM is introduced into a plasticized copolymer resin as described herein. Shown in FIG. 9 is a gel particle 80 having encapsulated PCM 82 incorporated at or near the center of gel particle 80 forming a PCM core 88. Each encapsulated PCM 82 has the structure of a core 84 (in a non-limiting example, a $C_{18}$ wax particle) coated with a shell 86 (in a non-limiting example, a melamine-formaldehyde polymer or resin). In a non-limiting embodiment, the encapsulated PCM 82 has an average particle size of from about 10 independently to about 300 microns. Shown in FIG. 10 is a gel particle 80' having multiple encapsulated PCMs 82' on the outside or on the surface thereof. Shown in FIG. 11 is a gel particle 80" having encapsulated PCMs 82" dispersed and distributed generally homogeneously on and within gel particle 80".

Figure 12:
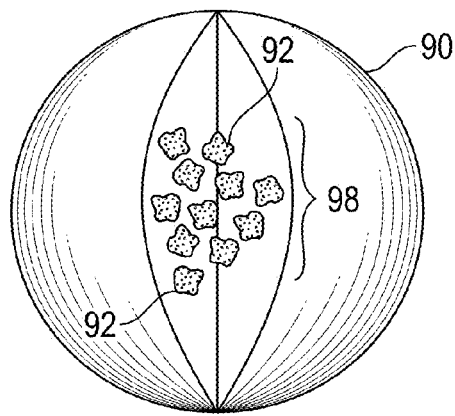
FIG. 12 is a schematic, partial sectional illustration of a gel particle having liquid and/or solid PCM encapsulated or contained within a gel particle.
Figure 13:
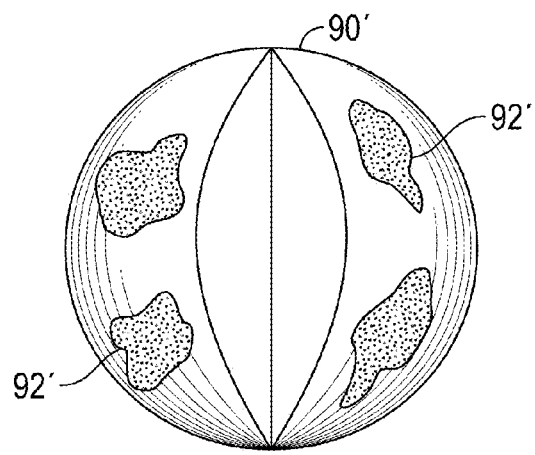
FIG. 13 is a schematic, partial sectional illustration of a gel particle having liquid and/or solid PCM at least partially covering the surface of a gel particle.
Figure 14:
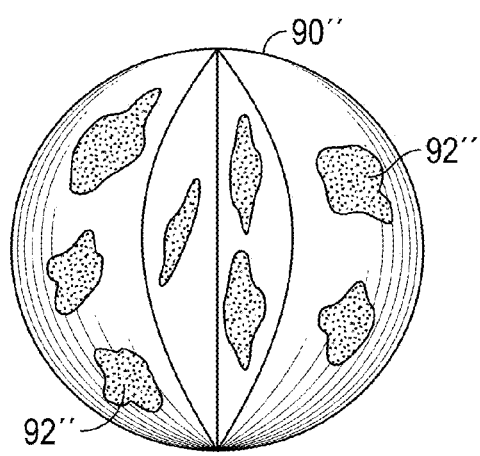
FIG. 14 is a schematic, partial sectional illustration of liquid and/or solid PCM dispersed generally homogeneously on and within a gel particle.

In further non-restrictive versions, FIG. 12 shows a gel particle 90 having liquid and/or solid PCM particulates 92 incorporated at or near the center of gel particle 90 forming a PCM core 98. The PCM particulates 92 may be any of those described elsewhere herein. Again, the PCM particulates 92 may have an average particle size of from about 10 independently to about 300 microns. Shown in FIG. 13 is a gel particle 90' having multiple PCMs 92" on the outside or the surface thereof. Shown in FIG. 14 is a gel particle 90" having and/or solid PCM particulates 92" dispersed and distributed generally homogeneously on and within gel particle 90".

Open cell flexible polyurethane foam generally has low thermal conductivity and if a phase change material is incorporated in a polyurethane foam, some of the phase change material will be isolated and ineffective because the thermal conductivity of the combination of open cell flexible polyurethane foam and phase change material without gel is very low. The utility of phase change material incorporated within open cell polyurethane foam will be largely limited to areas in direct contact with a heat source such as a human body. An important attribute is that by combining a conductive gel material with high heat capacity phase change material within an open cell flexible foam, a much greater amount of the phase change material will be available to respond to body heat and provide cooling. Phase change material alone in a foam mattress would provide some cooling directly under a person's body, but the contact area of a person lying on a mattress is a relatively small percentage of the whole volume of the mattress. By closely combining conductive gel and capacitive phase change material, much more of the mattress can engage in thermal regulation and act as a radiator or heat exchanger to move, absorb, store and release heat generated by a person.

The gel component of phase change gel has the unique property of acting as a heat transfer pathway when dispersed in an open cell flexible polyurethane foam or latex foam. When polyurethane foam containing phase change gel particles is compressed, phase change gel particles contact other phase change gel particles. Heat is more readily transferred from one phase change gel particle to the next phase change gel particle in contact or close proximity (relative to the open cell flexible foam), so that the thermal conductivity is increased and the migration of heat over longer distances is facilitated.

The addition of phase change materials (PCMs) to the gel particles provides temperature regulating properties of the gel and foam article. Phase change materials, as defined herein, correspond to materials that change states such as changing from a solid to a liquid state, which stores energy as the PCM goes from a relatively low enthalpy state to a relatively high enthalpy state. Alternatively, the PCM can change from a liquid to a solid state which releases energy as the PCM goes from a relatively high enthalpy state to a relatively low enthalpy state. As the temperature of the phase change gel and foam article increases and reaches the melting point of the phase change material, the temperature of the article is held constant at the PCM's melting point. Once the PCM has completely melted, the temperature of the phase change gel/foam combination will begin to increase again. As the temperature of the phase change gel/foam combination cools down and reaches the PCM's freezing point, the temperature of the article is held constant at the freezing point. Once the PCM has completely solidified by freezing, the temperature of the article will begin to decrease again. The phase change material in the compositions and methods herein may also be a solid that does not change states but has the capacity to store energy over various different solid phases, such as molecular rearrangements.

Since the gel containing phase change materials is semi-liquid, it will deform, but not appreciably compress. Thus, a gel-foam matrix has the very unique property of a "Variable Support Factor". Support factor is defined by ASTM D3574 as the ratio of the 65% and 25% IFD values. For a typical Viscoelastic foam, this ratio is about 2.0. As the gel-foam combination described herein is compressed in small increments, the change in force required matches the underlying foam until enough compression occurs to cause the gel particles to contact one another. At this point, the gel-foam begins to act more like gel than foam and the resistance to compression increases. The point at which this transition occurs will vary with the content of gel in the gel-foam matrix. Higher loading of gel results in the gel particles interacting earlier in a compression cycle.

Polyurethane Component

As defined herein, the term polyurethane foam means polyether-based polyurethane foam or polyester-based polyurethane foam or a combination polyether and polyester polyurethane foam. As noted, polyurethane foam is commonly produced by methods of molding and free-rise. A common design for continuous free-rise processing equipment is the MAXFOAM machine, available from Beamech Group Limited. This type of machine, schematically illustrated in FIG. 1, uses a trough 12 where the chemicals are first introduced from a mixing head 14. The foam chemicals (including, but not necessarily limited to, polyol(s), water, silicone surfactant, catalyst, blowing agent(s), and isocyanate) stay in the trough 12 for about 10 to 25 seconds and then spill over the trough lip onto a series of fall-plates 16 leading to the main conveyor 18. The fall-plates 16, side-walls (not shown) and conveyor(s) 18 are protected from the reacting foam chemicals by a continuous film feed (bottom film, side films and additional films for block shaping; not shown in FIG. 1). Flexible polyurethane foam 20 is continuously produced by this technique.

Figure 2:
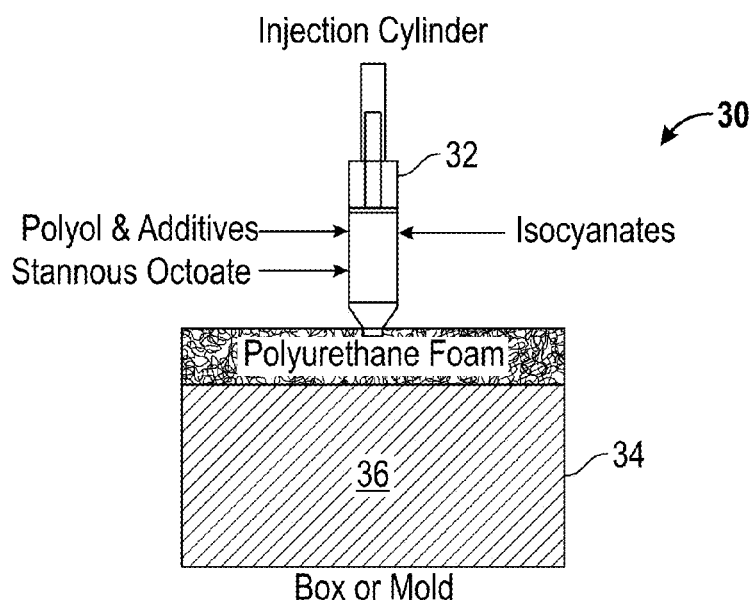
FIG. 2 is a schematic illustration of a box-pour machine for polyurethane foam.

Another common method of producing free-rise flexible foam is with a box-pour machine 30, as schematically illustrated in FIG. 2. This is a batch process whereby the foam chemicals are mixed and introduced in a variety of methods.

These methods include but are not limited to the following: a mix-head or injection cylinder 32 using metered chemicals, manual or automatic addition by weight, reaction-injection-molding (RIM) and injection cylinders are known methods of introducing the chemicals into a container 34 (box, mold or cylinder). The containers are typically lined with cardboard or plastic film to facilitate removal of the foam 36.

For the purposes herein, suitable open cell, flexible polyurethane foams are those conventional polyether and polyester polyurethane foams or a combination polyether and polyester polyurethane foam. The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups per molecule.

The term "polyether polyol" includes linear and branched polyethers (having ether linkages) containing at least two hydroxyl groups, and includes polyoxyethylene polyether polyols, polyoxypropylene polyether polyols or mixed poly(oxyethylene/oxypropylene)polyether polyols. Generally, polyethers are the polyoxyalkylene polyols, particularly the linear and branched poly(oxyethylene)glycols, poly(oxypropylene)glycols and their copolymers. Other alkylene oxides besides ethylene oxide and propylene oxide may be used to produce suitable polyols. It will be appreciated that in the context herein the term "polyol" encompasses and includes "polymer polyols" as those are generally defined in the industry.

Polyol useful herein may have a functionality of 1.5 to 6.0 using single or mixed initiators including but not limited to glycerin (glycerol), trimethylolpropane (TMP), propylene glycol (PG), dipropylene glycol (DPG), ethylene glycol (EG), diethylene glycol (DEG), methylpropanediol (mpdiol), water, sucrose, D-sorbitol, glucoside, starch glycosides, aliphatic amines such as ethylenediamine (EDA), ethanolamine, diethanolamine (DEOA), triethanolamine, diisopropanolamine, erythritol, butane diol, low molecular weight adducts of polyfunctional amines, polyfunctional alcohols, aminoalcohols, alcoholamines and mixtures thereof, and aromatic amines such as isomers of phenylene diamine, diethyl toluene diamine (DETA), pentaerythritol, isophorone diamine, 2,4,6-triaminotoluene, diethyltolylene diamine, and mixtures thereof, and the like. Polyol designs herein may have mixed, blocked or a combination of mixed and blocked ethylene oxide (EO) and mixed, blocked or a combination of mixed and blocked propylene oxide (PO), or may be based on natural sources or directly from natural sources such as soybean oil or castor-bean polyol.

The functionality or average functionality of a polyol should be taken into consideration in designing the proper foam formulation for producing polyurethane foam. In one non-limiting embodiment, the use of low functionality (about 2) polyol is useful for the production of viscoelastic foam. Where low functionality polyol(s) are used, a higher isocyanate index is generally required. The amount of isocyanate employed is frequently expressed by the term "index" which refers to the ratio of the total isocyanate used to the actual amount of isocyanate required for reaction with all of the active hydrogen-containing compounds present in the reaction mixture, multiplied by 100. For most foam applications, the isocyanate index is in the range from 60 to 140. An isocyanate index below 100 is typically used for viscoelastic foam, soft and super-soft conventional foam and soft or super-soft high resilient, or HR foam. A non-limiting preferred embodiment is the use of viscoelastic foam as the carrier of the in-situ phase change gel-foam. Open cell, flexible viscoelastic foam may be made using a wide range of polyols and isocyanates. For viscoelastic foam, polyol average functionalities typically range from about 2 to about 4, but may be higher in some cases and isocyanate functionalities range from about 2 to about 4, but may be higher in some cases. The isocyanate index used to produce viscoelastic foam is determined by the desired properties and the functionality and equivalent weights of the polyol(s) and isocyanate(s) used in the foam formulation. In one non-limiting preferred embodiment, viscoelastic foam used in the production of in-situ phase change gel-foam is made using a primary viscoelastic polyol with a functionality of about 3 and an equivalent weight of about 1000 and this is reacted with a blend of polymeric and di-functional MDI with an average functionality of about 2.3 at an index ranging from about 60 to about 90. The formation of an in-situ phase change gel-foam introducing plasticized elastomeric gel particles containing one or more phase change materials to polyurethane foam components for the co-formation of phase change gel and foam is possible using very wide range of polyurethane foam types and formulations. The polyurethane foam formulations may include but are not limited to the use of polyether polyol(s) alone or in combination with polyester polyol(s), grafted co-polymer polyol(s), polymer modifiers, cross-linkers, chain extenders and plasticizers. In one non-limiting embodiment, polyether polyol(s) are combined with polyester polyol(s) to achieve desired properties of the carrier foam. Many foam types were evaluated as carriers for in-situ phase change gel-foam and it was discovered that the embodied methods of producing in-situ phase change gel-foam may be applied to virtually any type of polyurethane foam, including but not limited to, conventional foams, viscoelastic foams, high resilient (HR) foams, polyester foams and polyether-polyester blend foams all ranging in density from about 0.5 pcf to about 10 pcf and ranging in hardness as measured by the ASTM D3574 25% IFD from about 3 to about 300.

Catalysts are used to control the relative rates of water-isocyanate (gas-forming) and polyol-isocyanate (gelling) reactions. The catalyst may be a single component, or in most cases a mixture of two or more compounds. In one non-limiting embodiment, suitable catalysts for polyurethane foam production are organotin salts and tertiary amines, used singly or together. The amine catalysts are known to have a greater effect on the water-isocyanate reaction, whereas the organotin catalysts are known to have a greater effect on the polyol-isocyanate reaction. Total catalyst levels generally vary from 0 to about 5.0 parts by weight per 100 parts polyol. The amount of catalyst used depends upon the formulation employed and the type of catalyst, as known to those skilled in the art. Although various catalysts may be used in the methods herein, control of the gelling catalyst level is important to producing foams with desired air permeability, which is a factor known to significantly affect foam cushioning performance. The following ranges of catalyst amounts may be satisfactory: amine catalyst from 0 to 2 parts per 100 parts polyol; and organotin catalyst from 0 to 0.5 parts per 100 parts polyol.

One or more surfactants may also be employed in the foam-forming composition. The surfactants lower the bulk surface tension, promote nucleation of cells or bubbles, stabilize the rising cellular structure and emulsify incompatible ingredients. The surfactants typically used in polyurethane foam applications are polysiloxane-polyoxyalkylene copolymers, which may generally be used at levels between about 0.5 and 3 parts by weight per 100 parts polyol. In the methods and compositions herein, from 0 to 2 parts by weight per 100 parts polyol of surfactant may be used, and alternatively 1 part by weight per 100 parts polyol.

A blowing agent may be included in the foam-forming composition. A common blowing agent is water that may be added in amounts from about 0.1 to 7 parts per hundred parts polyol. Water acts as a blowing agent when it reacts with isocyanates and produces carbon dioxide, which expands the foam. In one non-limiting embodiment, water as a blowing agent is added in an amount suitable to achieve a desired foam density. Other blowing agents known as auxiliary blowing agents can be used in combination with water. However, the auxiliary blowing agent is not reacted in the foam matrix but instead acts as an inert expansion gas.

Cross-linking or chain-extending additives may be included in the foam-forming composition to enhance processing, physical properties, and foam stability. Typically, cross-linking or chain extending additives are relatively small molecules containing 2 to 6 active hydrogen groups, or primary or secondary amine groups, and are added in amounts from 0 to 10 parts per hundred parts polyol. Optional, representative cross-linking or chain-extending additives include, but are not necessarily limited to, diethanolamine (DEOA), ethylene glycol (EG), diethylene glycol (DEG), propylene glycol (PG), dipropylene glycol (DPG), 1,4-butanediol (BDO), methyl-propane diol, glycerin and short chain difunctional and polyfunctional polyether or polyester polyols. In one optional, non-restrictive embodiment, the cross-linking additives are included in amounts from 0.2 to 5.0 parts per hundred parts polyol. Alternatively however, the methods and compositions herein may be practiced in the absence of a chain extender or cross-linking additives.

Optionally, other additives may be incorporated into the foam-forming composition. The optional additives include, but are not limited to, flame retardants, stabilizers, antimicrobial compounds, extender oils, dyes, pigments, and antistatic agents.

The open cell, flexible, viscoelastic foam described herein may be produced under pressure or under vacuum using batch processes or continuous processes. Pressure can be applied by platens or conveyors which compress the foam while the foam is not fully cured. Alternatively, the method is practiced under atmospheric pressure, in the regime of atmospheric pressure to greater than atmospheric pressure, or in the regime of atmospheric pressure to less than atmospheric pressure. The process may be a free rise process or may involve a mold as previously described.

Latex-Based Phase Change Gel-Foam

Open cell, flexible latex foam could be used in place of or in addition to polyurethane foam in combination with phase change gel to form unique latex phase change gel-foam. One process used for open cell, flexible latex foam production involves introducing air into the latex, e.g. whipping or beating warm natural or synthetic latex in the presence of additives to promote cell formation, stabilization and curing. The additives may include, but not necessarily be limited to, foam stabilizers, foam promoters, zinc oxide delayed action gelling agents and combinations thereof. A final step in this process is to cure the foam with heat. With the addition of phase change gel particles to the latex foam process, the heat applied to whip and cure the foam would also serve to partially or fully crosslink the phase change gel particles forming an integrated in situ open cell, flexible latex phase change gel-foam. Latex foam production processes known in the art for latex foam manufacturing include molded and free-rise latex methods produced with Dunlop or Talalay latex processes. In the Talalay latex process, the latex foam is cured by introducing carbon dioxide into the mold with latex. The carbon dioxide reacts with water forming carbonic acid, which lowers the pH and causes the latex to gel and hold its cell structure and shape. The mold temperature is then raised to about 230° F. and held for a determined amount of time to crosslink or vulcanize the latex polymer. In the Dunlop process, the latex mixture is gelled by addition of chemical additives such as sodium fluorosilicate and later the latex is vulcanized to crosslink or vulcanize by raising the temperature. The phase change gel copolymer resin may be added in the range of about 0.1 to about 200 parts per hundred of the rubber component of latex foam before the latex foam is gelled and cured.

Plasticized Elastomer Component

Phase change gels may be produced from high viscosity triblock copolymers and optionally with diblock copolymers that have been melted or mixed with a plasticizing agent, such as mineral oil, synthetic oil, etc., and optionally mixed with additives such as colorants, polyols, etc. One non-limiting embodiment of the method involves gel particles containing one or more phase change materials (in a non-limiting example, a plasticized triblock gel polymer containing one or more phase change materials) that is made in the form of flowable or "fluffy" solid, which if heated sufficiently, would form a gel that is added to the polyurethane foam components to produce the gel-foam. In almost all cases, it is expected that the foaming reaction generates sufficient heat to melt the phase change gel particles in the polyurethane foam. However, there may be cases where there is insufficient exothermic temperature to melt the phase change gel particles completely in the foam, resulting in phase change gel particles/foam that would still have desirable properties, but whose look and feel would be expected to be different.

Triblock copolymers include, but are not necessarily limited to, (SB)n styrene-butadiene, (SEB)n, (SIS) styrene-isoprene-styrene block copolymers, (SEBS) styrene-ethylene-butylene-styrene block copolymers, (SEP) styrene-ethylene-propylene block copolymers, (SEEPS) styrene-ethylene-ethylene-propylene-styrene block copolymers and the like. The suffix "n" here and with respect to these abbreviations elsewhere refers to the number of repeating polymer units. The triblock copolymers employed in the phase change gel may have the more general configuration of A-B-A. The A component represents a crystalline polymer end block segment of polystyrene; and the B component represents an elastomeric polymer center block segment. Elastomeric and polystyrene portions are incompatible and form a two-phase system consisting of sub-micron domains of glassy polystyrene interconnected by flexible elastomeric chains. These two discrete domains act as hard and soft block segments which help crosslink and reinforce the plasticized gelatinous triblock copolymer. This physical elastomeric network structure is reversible, and heating the polymer above the softening point of polystyrene temporarily disrupts the structure, which may be restored by lowering the temperature below the softening point again. It can thus be understood that the copolymer resin or gel particle may be at least partially crosslinked before, during or after introduction into the mixture of polyurethane foam forming components. As noted, heating the copolymer resin via heat produced by the reaction of the polyol/water and the polyisocyanate may partially or completely melt or crosslink the copolymer resin or gel particle. By "completely crosslink", it is meant that crosslinking has occurred to the maximum extent. However, it will be appreciated that it is not necessary to completely crosslink the gel particle when it is reacted to form a gelatinous elastomer. That is, a successful product may result if the gelatinous elastomer is only partially crosslinked. Even if the gel particle was fully or substantially crosslinked (defined herein as cured gel), it is expected that the exothermic foam reactions would cause the gel to rearrange bonds and/or become physically attached to the foam, and in some cases chemically attached to the polyurethane components when active hydrogen components, such as polyols, are used as a plasticizer alone or in combination with one or more non-active hydrogen plasticizers or are used as a carrier in the gel or gel particle. In the case where active hydrogen compounds are used, it would be expected that all or a portion of the active hydrogens would react with polyisocyanate forming linkages with the polyurea, polyurethane and other components of the polyurethane foam. It should be understood that the phase change material is different from the plasticizer, if present.

There is provided, in one non-limiting embodiment, a phase change gel produced by the method involving at least partially melting a plasticized copolymer resin, mixing in one or more phase change materials and optional additives such as thermally-conductive materials, and crosslinking the gel copolymer resin, to give a cured phase change gel, wherein the copolymer resin may be a triblock copolymer resin and/or diblock copolymer resin, and combinations thereof. The method further involves reducing the size of the cured phase change gel into particles having an average particle size between the range of about 0.01 to 10 millimeters.

In one non-limiting embodiment, the phase change gel particle is completely cured prior to addition to the polyurethane foam forming components. In this embodiment, a finished crosslinked gel is ground or cut into granules or a powder and then added into the foam during production of the foam. There are many techniques and methods for reducing the size of the gelled polymer and this embodiment is not limited to any particular size-reduction technique. In another non-restrictive version, the finished gel, which may or may not be crosslinked, is a relatively very fine grind (having an average particle size between the range of about 0.01 to 10 millimeters, alternatively between the range of about 0.01 to 2 millimeters), so that it may be dispersed in the foam to give a better fell and to avoid the possibility of separating from the foam forming components during the foaming reaction. The ground particles may have an average, volume of between about 0.001 independently to about 1000 mm$^3$, alternatively between about 0.01 independently to about 8 mm$^3$.

Phase change gel particles less than 0.01 millimeters are not discretely visible in an open cell flexible polyurethane foam or latex foam and are usually incorporated into the struts or solid elastomers regions of flexible foam, acting more like a coloring pigment. The term "discrete visible particles" is defined herein to mean that the phase change gel particles are visible, such as in the photomicrograph of FIG. 8 in a non-limiting embodiment, and that, while they are incorporated into the struts or solid elastomer regions of flexible foam, they are distinct from the foam. Phase change gel particles between 0.01 millimeters and 10 millimeters are preferable because the phase change gel particles are located within the foam open areas or "non-strut" regions. The gel component of phase change gel has the unique property of acting as a heat transfer pathway when dispersed in an open cell flexible polyurethane foam or latex foam. When polyurethane foam containing phase change gel particles is compressed, phase change gel particles contact other phase change gel particles. Heat is more readily transferred from one phase change gel particle to the next phase change gel particle in contact or close proximity (relative to the open cell flexible foam), so that the thermal conductivity is increased and the migration of heat over longer distances is facilitated. Most preferably, the phase change gel particle size is between the range of about 0.1 to 2 millimeters.

Diblock copolymers of the general configuration A-B may also be used alone or together with A-B-A triblock copolymers. Diblock copolymers are typically used to modify the properties of a triblock copolymer. The monomers suitable for use in diblock copolymers may be the same as those used in the triblock copolymers noted above.

Examples of copolymers that may be used to achieve one or more of the novel properties herein are styrene-ethylene-butylene-styrene block copolymers (SEBS) under trade designations KRATON G1650, KRATON G 1651, KRATON G1652, and other like A-B-A triblock copolymers available from Kraton Performance Polymers. Other examples of suitable triblock copolymer resins are available from Dynasol under trade designation of CH-6110 and CH-6174 and Kuraray under trade designation of SEPTON 8006.

Other grades of SEBS polymers may also be utilized herein provided such SEBS polymers exhibit the required properties. The styrene to ethylene and butylene weight ratio of SEBS useful in forming the gelatinous elastomer may range from lower than about 20:80 to above about 40:60. Typical ratio values for KRATON G1650, KRATON G 1651, KRATON G1652 are approximately about 30:70 to 33:67. These ratios may vary broadly from the typical product specification values.

Plasticizers suitable for making acceptable gels are well known in the art, they include, but are not necessarily limited to, rubber processing oils such as paraffinic and naphthenic petroleum oils, highly refined aromatic-free paraffinic and naphthenic food and technical grade white petroleum mineral oils, synthetic oils and natural oils and polyols made from natural oils and natural polyols. Synthetic oils are high viscosity oligomers such as non-olefins, isoparaffins, paraffins, aryl and/or alkyl phosphate esters, aryl and/or alkyl phosphite esters, polyols, and glycols. Many such oils are known and commercially available. Examples of various commercially available oils include, but are not necessarily limited to, PAROL® and TUFFLO® oils. Natural oils such as, but not limited to, canola oil, safflower, sunflower oil, soybean oil, and/or castor oils may be used. Natural oil-based polyols are biologically-based polyols such as, but not limited to, soybean-based and/or castor bean polyols. Suitable plasticizers may also include, but are not necessarily limited to, phthalate esters including, but not necessarily limited to bis(2-ethylhexyl)phthalate, commonly abbreviated DEHP ($C_6H_4(C_8H_{17}COO)_2$, sometimes called dioctyl phthalate and abbreviated DOP, diisononylphthalate (DINP), and waxes such as n-paraffins with carbon content greater than 14 that change from a liquid to a solid over the temperature range of expected use which when the wax has changed to a solid no longer acts as a "plasticizer". By "a temperature range of expected use" is meant from about −23 to about 104° C. The value of using polyols as plasticizers alone or together with other plasticizers is to provide the potential for chemical bonding of the gel particles with the polyurethane foam rather than just the physical bonding that occurs with non-reactive plasticizers such as paraffinic or naphthenic mineral oils. This is because the polyols have active hydrogens. One advantage of using polyols as plasticizers or co-plasticizers is that the final combined gel-foam may be less tacky and/or stronger than combined gel-foams made only with non-reactive plasticizers in the plasticized copolymer resin. The plasticizers described herein may also serve as carriers for modifying additives introduced into the gel or gel particles, such as phase change materials, i.e. carriers to move an additive within the gel and carriers used to transport an additive within the gel or gel particles. The plasticizer constitutes about 1 independently to about 1,400 pph (parts per hundred parts of triblock copolymer resin) and alternatively about 200 independently to about 800 pph (parts per hundred parts of triblock copolymer resin), in a gel suitable for in-situ polyurethane foaming is obtained.

The gel may also contain useful amounts of conventionally employed additives such as stabilizers, antioxidants, antistatic agents, antimicrobial agents, ultraviolet stabilizers, phase change materials, surface tension modifiers such as silicone surfactants, emulsifying agents, and/or other surfactants, solid flame retardants, liquid flame retardants, grafting polyols, compatible hydroxyl-containing chemicals which are completely saturated or unsaturated in one or more sites, solid or liquid fillers, antiblocking agents, colorants such as inorganic pigments or colorants, carbon black, organic colorants or dyes, reactive organic colorants or dyes, heat-responsive colorant, heat-responsive pigment, heat-responsive dye, pH-responsive colorant, pH-responsive pigment, pH-responsive dye and combinations thereof, fragrances, and thermally-conductive materials with thermal conductivity values in the range of 0.1 W/(m-° K) to 2000 W/(m-° K) such as talc, melamine, carbon black, graphite, aluminum oxide, aluminum nitride, zinc oxide, ferric oxide, diamond, titanium dioxide, magnesium oxide, silicon carbide, boron nitride, sodium carbonate, sodium bicarbonate, calcium carbonate, barium sulfate, metal flakes such as aluminum powder, and viscosity-modifiers such as fumed silica and clays, and other polymers in minor amounts and the like to an extent not affecting or substantially decreasing the desired properties of the combination of gelatinous elastomer and polyurethane foam herein. Minor amounts of other polymers and copolymers may be melt-blended with the styrene-ethylene-butylene-styrene block copolymers or other A-B-A copolymers mentioned above without substantially decreasing the desired properties. The optional colorant may be present in an amount up to about 50 parts per hundred (pph) of the copolymer resin, in one non-limiting embodiment. Colorants may be added as is, or may be covalently reacted on the copolymer backbone or fixed by pre-reacting, grafting, mechanical or chemical bonding compounds on the copolymer backbone and then fixing or bonding the color or dye on the grafted compound. Various organic molecules may be used for this purpose including, but not necessarily limited to, Milliken Polyurethane Dyes, Rebus pigments and dyes, and RYVEC pigments. The colorant is present in an amount up to about 50 parts per hundred of the A-B-A triblock copolymer. Alternatively, the colorant is used in the range of up to 2 pph of A-B-A triblock copolymer. The heat-responsive pigments, dyes and combination thereof can be used in the phase change gel. Colorants that are pH-sensitive that can change indicating colors as the pH changes can also be used in the gel. The phase change gel may also be coated or premixed with detackifying agents, such as melamine, calcium stearate, talc, and mixtures thereof, but not limited to the previously mentioned examples. The phase change gel may also be coated or premixed with tackifying agents to promote bonding.

Addition of phase change materials to the gel to make a phase change gel, and incorporating said phase change gel into polyurethane foam allows the foam article to store or release large amounts of energy, which is higher than heat absorption or heat release by heat capacity of the pure gel alone. Heat is stored if the solid phase change material changes to a liquid, and heat is released when the liquid phase change material changes to a solid. The melting point temperature is usually chosen to be in the 20° C. to 35° C. range to match the human comfort zone. Once the solid phase change material melts completely, all of the latent heat is used, and the phase change material must be cooled back down below its melting point to solidify the phase change material and recharge for the next melt cycle.

Table 1 shows a non-limiting list of phase change materials that can be used for incorporating into gel. The non-limiting list of phase change materials in Table 1 is for example purposes. Preferably, suitable phase change materials have a solid/liquid phase transition temperature from −10° F. to 220° F. (about −23° C. to about 104° C.). More preferably, the phase change solid/liquid phase transition temperature is from 68° F. to 95° F. (about 20° C. to about 35° C.). The phase change material can be classified as having non-polar characteristics such as n-hexadecane and n-octadecane, polar characteristics such as polyethylene glycol-based polymers and beeswax, and ionic characteristics such as $CaCl_2.6H_2O$ and $Na_2SO_4.10H_2O$.

Typically, a phase change material is selected to have low solubility in the gel, so that the phase change material can convert back to a solid after it has gone through a melt-cycle. Although alternatively the selected phase change material can have high solubility in the gel polymer, and upon cooling the phase change material will partially turn to a solid and partially stay as a liquid in the gel. If the phase change material has polar characteristics, then a non-polar gel is the best carrier matrix. Likewise, if the phase change material is non-polar, then a polar gel is the best carrier matrix. However, the carrier matrix should be selected to give the best liquid retention properties when the phase change material is a liquid, but not too compatible with the liquid phase change material so that the phase change material stays in the liquid state instead of recrystallizing to store additional cooling capacity.

Phase change material may also be microencapsulated prior to incorporating the PCM in a gel particle to make a phase change gel. Microencapsulated phase change materials can be encapsulated by polymeric coatings such as, but not limited to, acrylic, melamine-formaldehyde, urea-formaldehyde coatings and the like. In one non-limiting embodiment, the PCM may be coated on a core, which may comprise materials including, but not limited to, $C_{18}$ waxes, the other suitable core PCMs listed in Table 1, and combinations thereof. However, there are many other encapsulate coatings, particularly gel coatings, that may be used. The outside coating is selected to retain the phase change material for the freeze-thaw cycles and end use. "Microencapsulated" is defined herein as particles having an average particle size of from about 1 independently to about 1000 microns, alternatively from about 10 independently to about 300 microns. Alternatively, the PCM may be a complete or at least partial coating on the gel particles.

During the polyurethane foaming reaction, phase change materials can destabilize the foaming mixture. Large cells, soft foams, and partial or complete collapses can occur if the phase change material is added to the liquid polyurethane foam reactants. Therefore, the intent of compositions and methods described herein is to use the gel polymer as a carrier, sequestering agent, and/or encapsulant for liquid PCM.

TABLE 1

Phase Change Materials Properties

| Phase Change Material | Transition Temperature | | Latent Heat | Notes |
| --- | --- | --- | --- | --- |
| | ° F. | ° C. | Btu/lb | |
| polyethylene glycol 600 | 68-77 | 20-25 | 63 | non-paraffin organic |
| camphene | 50 | 10 | 102 | non-paraffin organic |
| oxazoline wax | 122 | 50 | | non-paraffin organic |

TABLE 1-continued

Phase Change Materials Properties

| Phase Change Material | Transition Temperature °F. | Transition Temperature °C. | Latent Heat Btu/lb | Notes |
|---|---|---|---|---|
| d-lactic acid | 79 | 26.1 | 79 | non-paraffin organic |
| formic acid | 47 | 8.3 | 118 | Organic |
| acrylic acid | 54 | 12.2 | 66.7 | Organic |
| p-xylene | 56 | 13.3 | 68.1 | Organic |
| caprylic acid | 61 | 16.1 | 63.7 | Organic |
| jojoba wax | 52-53.2 | 11.2-11.8 | | insoluble fatty of natural oils and waxes |
| cotton seed oil | 94.1 | 34.5 | | insoluble fatty of natural oils and waxes |
| coconut | 77 | 25 | | insoluble fatty of natural oils and waxes |
| almond | 56.3 | 13.5 | | insoluble fatty of natural oils and waxes |
| beechnut | 74.3 | 23.5 | | insoluble fatty of natural oils and waxes |
| black mustard | 61.7 | 16.5 | | insoluble fatty of natural oils and waxes |
| candlenut | 68.9 | 20.5 | | insoluble fatty of natural oils and waxes |
| castor oil | 55.4 | 13 | | insoluble fatty of natural oils and waxes |
| corn oil | 65.3 | 18.5 | | insoluble fatty of natural oils and waxes |
| cotton seed stearin | 83.3 | 28.5 | | insoluble fatty of natural oils and waxes |
| esparto | 63.5 | 17.5 | | insoluble fatty of natural oils and waxes |
| poppy seed | 68.9 | 20.5 | | insoluble fatty of natural oils and waxes |
| rape seed (canola) | 66.2 | 19 | | insoluble fatty of natural oils and waxes |
| pumpkin seed | 136.4 | 58 | | insoluble fatty of natural oils and waxes |
| soy bean | 80.6 | 27 | | insoluble fatty of natural oils and waxes |
| sunflower | 73.4 | 23 | | insoluble fatty of natural oils and waxes |
| walnut | 57.74 | 14.3 | | insoluble fatty of natural oils and waxes |
| white mustard seed | 59.9 | 15.5 | | insoluble fatty of natural oils and waxes |
| beeswax | 143 | 62 | 76 | insoluble fatty of natural oils and waxes |
| $NH_4Cl\ Na_2SO_4 \cdot 10H_2O$ | 52 | 11.1 | 70 | hydration-hehydration reaction |
| $NaCl\ NH_4Cl\ 2Na_2SO_4 \cdot 20H_2O$ | 55 | 12.8 | 78 | hydration-dehydration reaction |
| $NaCl\ Na_2SO_4 \cdot 10\ H_2O$ | 65 | 18.3 | 80 | hydration-dehydration reaction |
| n-tetradecane | 41.9 | 5.5 | 98 | hydrocarbon paraffins |
| n-pentadecane | 50 | 10 | 88 | hydrocarbon paraffins |
| n-hexadecane | 62.1 | 16.7 | 102 | hydrocarbon paraffins |
| n-heptadecane | 71.1 | 21.7 | 92 | hydrocarbon paraffins |
| n-octadecane | 82.4 | 28 | 105 | hydrocarbon paraffins |
| n-nonadecane | 89.6 | 32 | | hydrocarbon paraffins |
| n-eicosane | 98.1 | 36.7 | 106 | hydrocarbon paraffins |
| n-heneicosane | 104.4 | 40.2 | 86 | Hydrocarbon paraffins |
| n-decosane | 111.2 | 44 | 107 | hydrocarbon paraffins |
| n-tricosane | 117.5 | 47.5 | 100 | hydrocarbon paraffins |
| trimethylolethane | 178 | 81 | | mesocrystalline phase change |
| C-16 to C-22 alkyl hydrocarbons | 50-122 | 10-50 | >50 | alkyl hydrocarbons |
| natural rubber | Varies to 77 | Varies to 25 | | crystalline phase change |
| polychloropropene | 89.6 | 32 | >54 | |
| Witco 45A | 87.8 | 31 | >54 | crystalline alkyl hydrocarbons |
| Witco K-61 | 75.2 | 24 | >54 | crystalline alkyl hydrocarbons |
| Witco K-51 | 62.6 | 17 | >54 | crystalline alkyl hydrocarbons |
| Witco 85010-1 | 44.6 | 7 | >54 | crystalline alkyl hydrocarbons |
| pentaeythritol | plastic crystals (no change of state but release high amounts of E before melting) | | | |
| polyhydric alcohols | plastic crystals (no change of state but release high amounts of E before melting) | | | |
| acrylate and methacrylate polymers | 0 | −17.78 | | with C-16 to C-18 alkyl side chains |

TABLE 1-continued

Phase Change Materials Properties

| Phase Change Material | Transition Temperature | | Latent Heat | Notes |
| --- | --- | --- | --- | --- |
| | °F. | °C. | Btu/lb | |
| $CaBr_2 \cdot 6H_2O/NaCl$ | 59 | 15 | | hydration-dehydration reaction |
| $Na_2SO_4 \cdot 10H_2O/NaCl$ | 64 | 17.78 | | hydration-dehydration reaction |
| $CaCl_2 \cdot 6H_2O$ | 82 | 27.78 | | hydration-dehydration reaction |
| $Na_2SO_4 \cdot 10H_2O$ | 90 | 32.22 | | hydration-dehydration reaction |
| $CaBr_2 \cdot 6H_2O$ | 93 | 33.89 | | hydration-dehydration reaction |

Gel Preparation

Phase change gel that is suitable for use in polyurethane foams may be prepared by a method or methods including batch-wise or continuous mixing in a mixer, rotating vessel, ribbon blender, paddle blender, plough blender, plastic screw, or any other equipment known in the art of skill that is used for mixing solids with additives.

Alternatively, phase change gel may be prepared by mixing continuously in a mixer/auger system. A-B-A triblock resin, plasticizer, phase change material, and other additives may be added and mixed with an auger with or without heat to produce a phase change gel suitable for incorporation into polyurethane foam upon exiting the mixer/auger system.

Alternatively, phase change gel may be prepared by mixing either batch-wise or continuously in a ribbon blender system. A-B-A triblock resin, plasticizer, phase change material and optional components such as, but not limited to, solvent, colorant, and thermally conductive materials may be added and mixed with a ribbon blender with or without heat to produce phase change gel suitable for incorporation into polyurethane foam upon exiting the ribbon blender.

Alternatively, phase change gel may be prepared by adding all of the ingredients into a plastic screw and melt blending and/or extruding the melt mixture into a mold or through a screen that has rotating blades/knives which cut the extruded pieces into fine particles. The phase change gel can be melted by other means with heating and mixing. Optionally, the melt mixture can be sprayed, dripped from an orifice or pin or broken apart by putting the liquid on a spinning disk and allowing centrifugal force to help shear the molten particles into individual droplets. These fine plasticized gel particles may be coated with an organic powder such as melamine, an inorganic powder such as talc or fumed silica, or an oil or other liquid to inhibit or prevent the particles from sticking together. Particles are produced with average particle size between the range of about 0.01 to 10 millimeters.

Alternatively, the phase change gel with optional thermally-conductive material may be prepared by melt-blending all of the ingredients and extruding the melt mixture through a die or pouring the melt mixture into a mold or onto a conveyor. The solidified plasticized gel can be shaved into small pieces or flakes for incorporating into polyurethane or latex foams.

Alternatively, the phase change gel and optional thermally-conductive material may be cryogenically ground by using liquid or solid carbon dioxide, liquid nitrogen, or any other suitable cryogenic liquid to cool down the plastic to make the particle more brittle and able to grind to a controllable size. If carbon dioxide is used, the grinding temperature can be as low as −110° F. (−79° C.). If liquid nitrogen is used, the grinding temperature can be as low as −321° F. (−196° C.).

The A-B-A triblock copolymer resin may be mixed with a plasticizer and phase change material, optional components such as, but not limited to, solvent, colorant, thermal conductive materials, or additives at a temperature between about −10° F. to about 400° F. (about −23° C. to about 204° C.) and at a pressure from full vacuum to 20 atm (2 MPa).

One suitable method of making gel or gel particles is by mixing the A-B-A triblock copolymer resin with a colorant. The colorant and a compatible solvent or solvents may also be premixed to aid in dispersing the colorant throughout the resin. Other methods of dispersing the colorant may be by heating the colorant and/or resin to reduce viscosity by temperature or reducing viscosity in a compatible inert carrier. Suitable inert carriers include, but are not necessarily limited to, non-polar carriers, polar carriers, polyether polyol carriers, polyester polyol carriers, isocyanate/polyether prepolymers, liquid or solid fillers, liquid or solid flame retardants, water, and/or blowing agents. Another method is to use an A-B-A triblock copolymer with the desired color already compounded in or fixed on the triblock copolymer elastomer. After the colorant has adequately coated the resin, an optional solvent and plasticizer is/are added in the required weight ratio relative to the resin. Suitable solvents include, but are not necessarily limited to, the following examples: saturated acyclic aliphatic hydrocarbons, unsaturated acyclic aliphatic hydrocarbons, saturated cyclic aliphatic hydrocarbons, unsaturated cyclic aliphatic hydrocarbons, aromatic hydrocarbons, chlorinated hydrocarbons, alcohols, glycol ethers, ketones, aldehydes, epoxides, carboxylic acids, esters, glycol ether esters, fatty acids, phosphite esters, phosphate esters, dimethylsulfoxide, dimethylformamide, hexamethylphosphorotriamide, furan, water, methylene chloride, toluene, acetone and combinations thereof. The solvent may be added in the range of from about 1 to about 500 parts of triblock copolymer resin. The solvent can be added to soften or melt some of the polystyrene units to swell the resin so the plasticizer can migrate into the resin more quickly. The solvent also aids in dispersing the colorant and helping the colorant to penetrate the resin and to help reduce colorant or dye leaching in the final product. The solvent may remain in the gel or be evaporated from the gel or resin after colorant penetration or plasticizer addition. One suitable method is to remove the solvent prior to dispersing the prepared gel in the polyol blend. Heating alone or in combination with solvent will also help in the plasticizer penetration into the A-B-A triblock copolymer resin. Heating the final gel product increases the evaporation rate of the solvent from the gel. Heating the unplasticized resin or plasticized resin also helps in fixing the colorant to reduce leaching and migration of color away from the plasticized gel. One preferred but non-limiting embodiment for coloration of the A-B-A triblock copolymer resin is to add dye using water as a solvent, then after thorough mixing; the water is evaporated leaving the dye as a coating and in some cases penetrating the A-B-A triblock copolymer resin. The evaporation techniques may include, but are not limited to the use of heated air, vacuum, heated chamber, infrared heating or combinations thereof.

Figure 3:
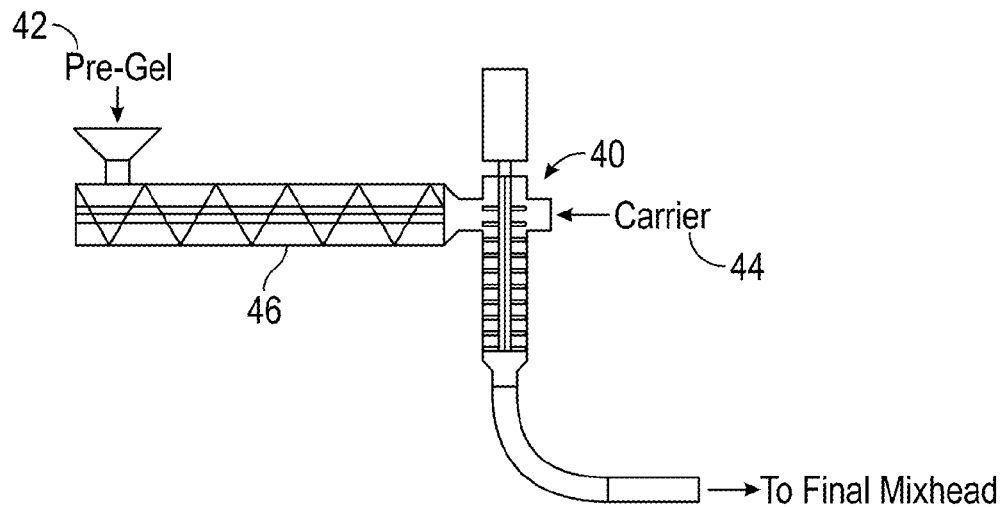
FIG. 3 is a schematic illustration of an auger mixing system for phase change gel and polyol.
Figure 4:
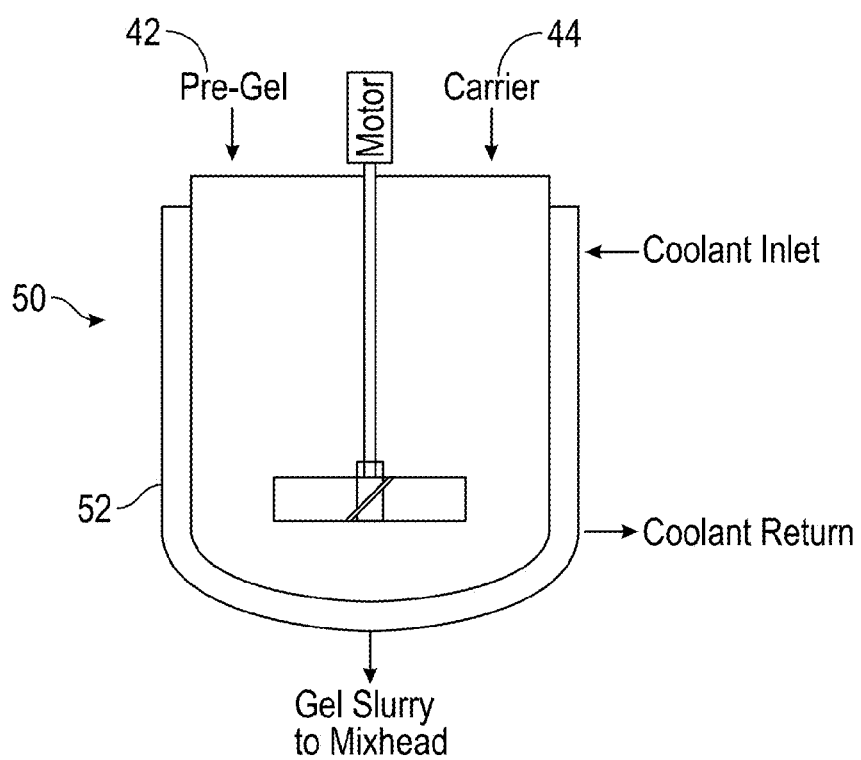
FIG. 4 is a schematic illustration of a mixing system for phase change gel and polyol.

One method of adding phase change gel to the compatible carrier is by augering the gel 42 into a mix chamber 40 using auger 46, as schematically illustrated in FIG. 3, where the gel 42 and compatible carrier 44 are mixed prior to adding other chemicals required to make polyurethane foam. Alternatively, mixing may be performed directly into the main mix head or can be mixed in a separate mix head and the gel and compatible carrier mixture fed into the main mix head with the other formulation components. Another non-restrictive method may be to use the auger to mix the gel 42 and compatible carrier together while augering to the main mix head. Another non-limiting embodiment of adding gel 42 to the compatible carrier 44 is by adding the gel into a compatible carrier in a mix tank 50, as schematically illustrated in FIG. 4. A typical mix tank 50 may have a heating/cooling jacket 52 for controlling the temperature within the tank. The carrier is added to the mixing tank and then the gel 42 is mixed into the carrier while agitating. While mixing, the gel 42 may be added to the tank gradually or all at once. Alternatively, the gel 42 may be added to the mixing tank first and then the compatible carrier added to the tank while mixing. It will be appreciated that the method described herein is not limited to these two examples, since there are many combinations for combining gel with a compatible carrier before incorporating gel into final polyurethane foam.

It will be appreciated that the method described herein is not limited to these examples, since there are many possible combinations for combining phase change gel with a compatible carrier before incorporating phase change gel into final polyurethane foam. Further, latex foam reactants could be used for the compatible carrier, and the mixture used for producing latex foam.

Applications of the Combined Gel Elastomer and Polyurethane foams

The list below shows some, but not all, of the applicable uses of the combination of phase change gel and open cell flexible polyurethane foam or latex foam produced by the methods herein.

1. Mattresses, pillows, and bed-top products;
2. General furnishings and Upholstered furniture including pet beds, cushions, armrests, seat-backs, foot-rests, decorative cushioning and functional support.
3. Rebond carpet pad or use as a floor mat (rebond carpet pad uses recycled foam to create the pad that goes under carpet, giving a cushioned feel and extra life to the carpet);
4. Use as a shoe insert foamed in-situ with energy absorption foam, viscoelastic foam or other foam;
5. Use in medical applications such as wheelchair seat cushions and backs, orthopedic shoes, hospital beds, gurney pads, medical bed pads, medical supports and cushioning;
6. Use in conventional polyether polyurethane foams, high resilient polyether polyurethane foams, viscoelastic polyether polyurethane foams, semi-rigid polyether polyurethane foams, rigid polyether polyurethane foams, polyester polyurethane foams, combined polyether-polyester foam or latex foam for general cushioning, energy absorption, packaging, sealants and fillers; and
7. Seat cushions, seat backs, headrests and armrests of chairs and seats for application in vehicles such as automobiles, motorcycles, bicycles, buses, aircraft, watercraft, tractors and other agricultural equipment such as combines, construction equipment and utility vehicles.

One suitable application of the methods and compositions herein includes incorporating phase change gel in viscoelastic polyurethane foam. The phase change gel, optionally in combination with a carrier, may be added to the unreacted polyurethane components and incorporated in the open cell, flexible viscoelastic polyurethane foam. Adding phase change gel to viscoelastic polyurethane gel may result in higher support factors, higher thermal conductivity, and higher thermal storage capacity through latent heat absorption around the melting point temperature of the phase change material.

The flexible polyurethane foams or latex foams with the phase change gel particles described herein may find utility in a very wide variety of applications. More specifically and other in non-limiting embodiments, the combined polymers would be suitable as pillows or pillow components, including, but not necessarily limited to, pillow wraps or shells, pillow cores, pillow toppers, for the production of medical comfort pads, medical mattresses and similar comfort and support products, and residential/consumer mattresses mattress toppers, and similar comfort and support products, typically produced with conventional flexible polyurethane foam or fiber. All of these uses and applications are defined herein as "bedding products". Alternatively, the combination of phase change gel/open cell flexible polyurethane foams described herein are expected to be useful for the production of upholstered furniture to replace conventional foam, polyester fiber or other support materials. Examples of these applications include but are not limited to upholstered chair backs, headrests, foot-rests, arm-rests, neck supports, quilting support and cushioning and the like and combinations thereof. All of these latter uses and applications are defined herein as "furniture upholstery".

The invention will now be described more specifically with respect to particular formulations, methods and compositions herein to further illustrate the invention, but which examples are not intended to limit the methods and compositions herein in any way. Tables 2 and 3 presents seventeen formulation examples of open cell polyurethane flexible foams made according to the methods described herein. Foam properties are presented in the lower portion of Tables 2 and 3. The component definitions and plasticized gelatinous triblock polymer descriptions are given in Table 4.

TABLE 2

FORMULATION EXAMPLES - POLYURETHANE FLEXIBLE FOAMS

| Sample # | Units | 5504 | 5513 | 6051 | 6052 | 6053 | 6054 | 6057 | 6058 |
|---|---|---|---|---|---|---|---|---|---|
| X-48 | pph | 100 | | | | | | | |
| X-49 | pph | | 100 | | | | | | |
| X-50 | pph | | | 100 | 100 | 100 | 100 | 100 | 100 |
| Water Total | pph | 1.77 | 1.82 | 2.25 | 2.25 | 2.25 | 2.25 | 2.25 | 2.25 |
| L-618 | pph | 0.8 | 0.8 | 1.4 | 1.4 | 1.4 | 1.4 | 1.4 | 1.4 |
| A-133 | pph | 0.5 | | | | | | | |
| ZF-10 | pph | | 0.1 | 0.16 | 0.16 | 0.16 | 0.16 | 0.16 | 0.16 |
| T-Cat 110 | pph | 0.08 | 0.06 | 0.10 | 0.10 | 0.10 | 0.10 | 0.10 | 0.10 |
| Gel #14 | pph | 30.0 | | | | | | | |
| Gel #18 | pph | | 30.0 | | | | | | |
| Gel #24 | pph | | | | | 30.0 | | 30.0 | |
| Gel #25 | pph | | | | | | 30.0 | | |

TABLE 2-continued

FORMULATION EXAMPLES - POLYURETHANE FLEXIBLE FOAMS

| Sample # | Units | 5504 | 5513 | 6051 | 6052 | 6053 | 6054 | 6057 | 6058 |
|---|---|---|---|---|---|---|---|---|---|
| Gel #26 | pph | | | | | | 30.0 | | |
| Gel #27 | pph | | | | | | | | 30.0 |
| MDI | pph | 48.2 | 46.88 | 47.72 | 47.72 | 47.72 | 47.72 | 47.72 | 47.72 |
| Cream Time | sec | 21 | 40 | 24 | 26 | 26 | 26 | 26 | 25 |
| Rise Time | sec | 127 | 200 | 129 | 166 | 170 | 175 | 173 | 173 |
| Settle | inches | 0 | 0 | 0 | 0 | 0 | 0 | 0 | 0 |
| Density | pcf | 4.56 | 5.05 | 3.11 | 3.98 | 3.97 | 3.96 | 3.96 | 3.96 |
| Airflow[1] | SCFM | 2.9 | 3.4 | 3.6 | 3.8 | 4.8 | 4.9 | 4.2 | 4.6 |
| 25% IFD[2] | Lbf/50 in$^2$ | 6.2 | 19.1 | 12.3 | 10.4 | 7.6 | 7.8 | 8.4 | 8.3 |

[1]Airflow: ASTM D 3574 G
[2]25% IFD: ASTM D 3574 B

TABLE 3

FORMULATION EXAMPLES POLYURETHANE FLEXIBLE FOAMS

| Sample # | Units | 6702 | 6703 | 6704 | 6705 | 6706 | 6707 | 6708 | 6709 | 8304 |
|---|---|---|---|---|---|---|---|---|---|---|
| X-51 | pph | 100 | 100 | 100 | 100 | 100 | 100 | 100 | 100 | |
| X-52 | pph | | | | | | | | | 100 |
| Water Total | pph | 2.10 | 2.10 | 2.10 | 2.10 | 2.10 | 2.10 | 2.10 | 2.10 | 2.07 |
| L-618 | pph | 1.20 | 1.20 | 1.20 | 1.20 | 1.20 | 1.20 | 1.20 | 1.20 | 1.00 |
| ZF-10 | pph | 0.20 | 0.20 | 0.20 | 0.20 | 0.20 | 0.20 | 0.20 | 0.20 | 0.15 |
| T-Cat 110 | pph | 0.12 | 0.12 | 0.12 | 0.12 | 0.12 | 0.12 | 0.12 | 0.12 | 0.17 |
| Gel #30 | pph | 30.0 | | | | | | | | |
| Gel #31 | pph | | 30.0 | | | | | | | |
| Gel #32 | pph | | | 30.0 | | | | | | |
| Gel #33 | pph | | | | 30.0 | | | | | |
| Gel #34 | pph | | | | | 30.0 | | | | |
| Gel #35 | pph | | | | | | 30.0 | | | |
| Gel #36 | pph | | | | | | | 30.0 | | |
| Gel #37 | pph | | | | | | | | 30.0 | |
| Gel #38 | pph | | | | | | | | | 36.0 |
| MDI | pph | 47.8 | 47.8 | 47.8 | 47.8 | 47.8 | 47.8 | 47.8 | 47.8 | 42.5 |
| Cream Time | sec | 21 | 22 | 22 | 20 | 22 | 28 | 22 | 23 | 28 |
| Rise Time | sec | 148 | 156 | 161 | 155 | 158 | 257 | 140 | 155 | 170 |
| Settle | inches | 0 | 0 | 0 | 0 | 0 | 2 | 0 | 0 | 0 |
| Density | pcf | 4.15 | 4.27 | 4.21 | 4.34 | 4.23 | 5.21 | 4.16 | 4.34 | 4.31 |
| Airflow[1] | SCFM | 2.8 | 3.5 | 4.0 | 3.5 | 3.9 | 8.7 | 2.6 | 4.1 | 4.2 |
| 25% IFD[2] | Lbf/50 in$^2$ | 21.0 | 16.1 | 14.1 | 13.9 | 13.9 | 5.3 | 23.2 | 14.9 | 12.7 |

[1]Airflow: ASTM D 3574 G
[2]25% IFD: ASTM D 3574 B

TABLE 4

COMPONENT DEFINITIONS

| | |
|---|---|
| X-48 | Polyol Blend from Peterson Chemical Technology, OH 169.7 |
| X-49 | Polyol Blend from Peterson Chemical Technology, OH 157.3 |
| X-50 | Polyol Blend from Peterson Chemical Technology, OH 148.4 |
| X-51 | Polyol Blend from Peterson Chemical Technology, OH 145.6 |
| X-52 | Polyol Blend from Peterson Chemical Technology, OH 135.7 |
| F3222 | 3200 MW Conventional Polyol from Bayer, 52.0 OH |
| A-133 | 23% bis(dimethylaminoethyl)ether in 3000 MW polyol |
| ZF-10 | Reactive catalyst available from Huntsman Chemicals |
| L-618 | Silicone surfactant available from Momentive Performance Materials |
| MDI | Polymeric MDI having a NCO content of about 32.6% with an average functionality of about 2.4 |
| T-Cat 110 | Stannous octoate catalyst available from Gulbrandsen Chemicals |

Gel #14 (Plasticized Gelatinous Triblock Copolymer)

Add 82.47 grams Kraton G1651H
Add 1.03 grams Milliken X17AB
Add 45.91 grams Acetone
Evaporated to 1.12 gram acetone
Added 372.22 grams of hydrogenated paraffinic oil TABLE 4-continued

COMPONENT DEFINITIONS

Gel #18 (Plasticized Gelatinous Triblock Copolymer)

Add 100.44 grams Kraton G1651H
Add 1.14 grams Milliken X17AB
Add 55.9 grams Acetone
Add 446.80 grams of hydrogenated paraffinic oil
Evaporated acetone Gel #24 (Plasticized Gelatinous Triblock Copolymer)

Add 174.15 grams Kraton E1830
Add 1.99 grams Milliken X17AB
Add 35.51 grams Acetone
Add 530.5 grams of hydrogenated paraffinic oil
Evaporated acetone Gel #25 (Plasticized Gelatinous Triblock Copolymer)

Add 132.67 grams Kraton G1651H
Add 1.53 grams Milliken X17AB
Add 27.44 grams Acetone
Add 577.73 grams of hydrogenated paraffinic oil
Evaporated acetone

TABLE 4-continued

COMPONENT DEFINITIONS

Gel #26 (Plasticized Gelatinous Triblock Copolymer)

Add 132.85 grams Kraton E1830
Add 1.57 grams Milliken X17AB
Add 40.06 grams Acetone
Add 581.92 grams of hydrogenated paraffinic oil
Evaporated acetone
Gel #27 (Plasticized Gelatinous Triblock Copolymer)

Add 132.01 grams Kraton E1830
Add 1.55 grams Milliken X17AB
Add 52.8 grams Acetone
Add 578.34 grams of hydrogenated paraffinic oil
Evaporated acetone
Gel #30 (Plasticized Gelatinous Triblock Copolymer)

Add 130.5 grams of Kraton G1651H
Add 68.95 grams of Water-based dye
Evaporate water away at 230° F. (110° C.)
Add 559.7 grams of hydrogenated paraffinic oil
Mix
Gel #31 (Plasticized Gelatinous Triblock Copolymer)

Add 130.6 grams of Kraton G1651H
Add 34.5 grams of Colorant (low-water dye)
Evaporate water away at 230° F. (110° C.)
Add 561.1 grams of hydrogenated paraffinic oil
Mix
Gel #32 (Plasticized Gelatinous Triblock Copolymer)

Add 130.6 grams of Kraton G1651H
Add 30.4 grams of Colorant (low-water dye with fixing additive)
Evaporate water away at 230° F. (110° C.)
Add 561.1 grams of hydrogenated paraffinic oil
Mix
Gel #33 (Plasticized Gelatinous Triblock Copolymer)

Add 130.6 grams of Kraton G1651H
Add 27.2 grams of Colorant (no-water dye)
Evaporate water away at 230° F. (110° C.)
Add 561.1 grams of hydrogenated paraffinic oil
Mix
Gel #34 (Plasticized Gelatinous Triblock Copolymer)

Add 48.83 grams of Kraton G1651H
Add 25.88 grams of Water-based dye
Evaporate water away at 230° F. (110° C.)
Add 6.45 grams of Soybean-based polyol and 208.6 grams of hydrogenated paraffinic oil
Mix
Gel #35 (Plasticized Gelatinous Triblock Copolymer)

Add 48.83 grams of Kraton G1651H
Add 25.88 grams of Water-based dye
Evaporate water away at 230° F. (110° C.)
Add 43.0 grams of Canola Oil and 172.0 grams of hydrogenated paraffinic oil
Mix
Gel #36 (Plasticized Gelatinous Triblock Copolymer)

Add 48.83 grams of Kraton G1651H
Add 25.88 grams of Water-based dye
Evaporate water away at 230° F. (110° C.)
Add 215.0 grams of hydrogenated paraffinic oil
Mix
Gel #37 (Plasticized Gelatinous Triblock Copolymer)

Add 48.83 grams of Kraton G1651H
Add 25.88 grams of Water-based dye
Evaporate water away at 230° F. (110° C.)
Add 37.6 grams of X28 (phase change additive from Peterson Chemical Technology) and 177.4 grams of hydrogenated paraffinic oil
Mix

TABLE 4-continued

COMPONENT DEFINITIONS

Gel #38 (Plasticized Gelatinous Triblock Copolymer with n-octadecane phase change additive)

Figure 5:
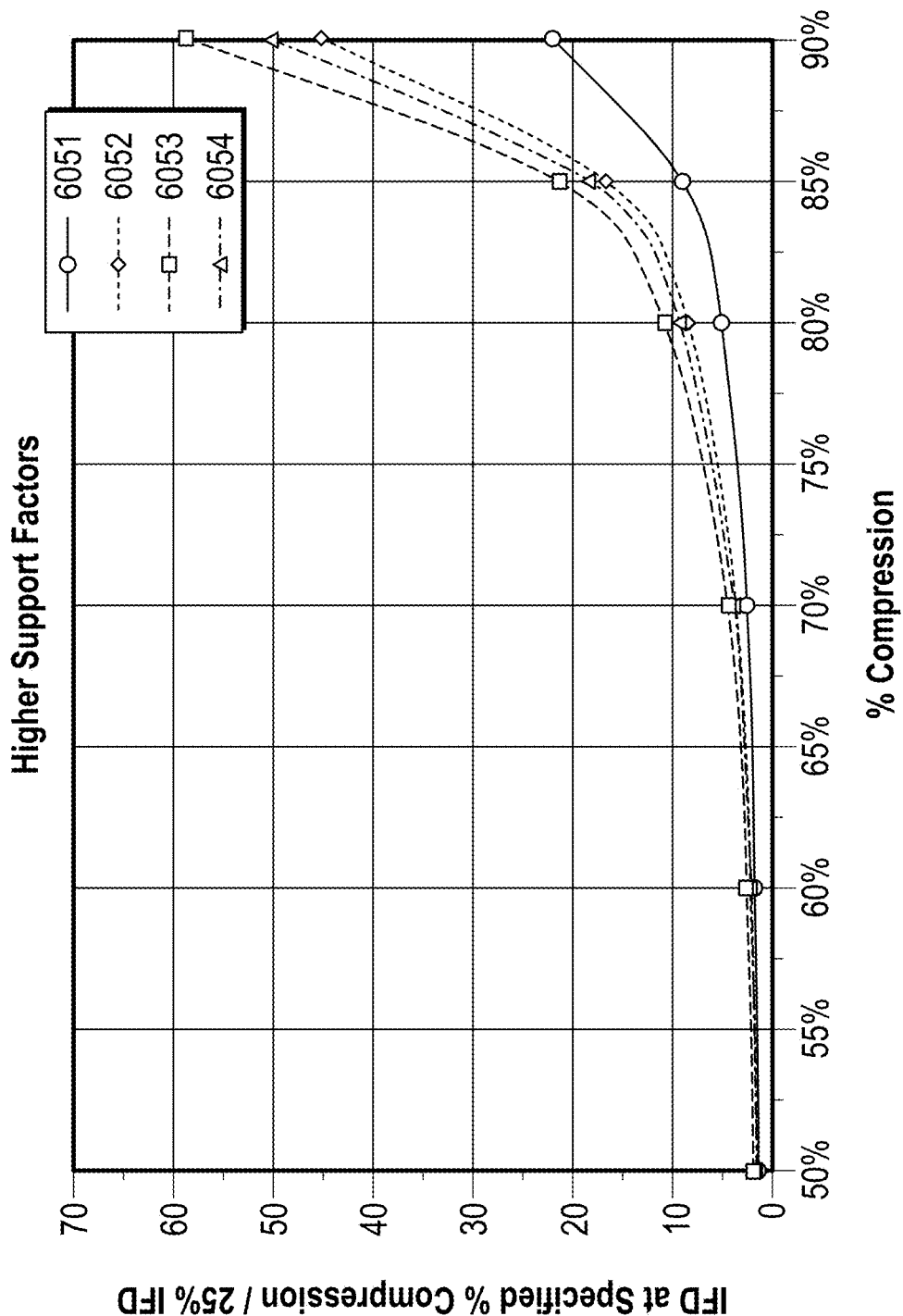
FIG. 5 is a graph of higher support factors at a compression greater than 50% plotting the ratio of IFD at specified % compression relative to 25% IFD as a function of % compression.

Add 48.83 grams of Kraton G1651H
Add 25.88 grams of Water-based dye
Evaporate water away at 230° F. (110° C.)
Add 209.97 grams of hydrogenated paraffinic oil
Add 258.80 grams of X29 (phase change additive from Peterson Chemical Technology)
Mix Higher Support Factors One advantage of this method described herein in producing open cell flexible foam is that it gives the foam higher support factors than a foam without the triblock copolymer elastomer. A sample with dimensions of 4" wide×7.25" long×2" high (10.2×18.4×5.1 cm) was compressed on an IFD instrument. The sample was tested at 25%, 40%, 50%, 60%, 70%, 80%, 85%, 0 and 90% compression. At each compression setting, the force was allowed to relax for 60 seconds before the force was recorded. Table 5 shows the compression forces for each compression percentage exhibited by four foam samples reported in Table 1. FIG. 5 shows the data graphically. The control sample 6051 without any gelatinous elastomer had a support factor of 1.95 at 65% compression relative to 25% compression. The gel-containing Viscoelastic foams had support factors considerably above this. For non-gel polyurethane foam, the 65%-to-25% support factor is typically in the range of 1.9-2.2. With 30 pph of gel added, the support factor increased to 2.6-3.1 for the 65% compression relative to 25% compression. The rate of change of the force required to compress gel-foam as a function of the percent compression is relative to the parts of gel per hundred parts of Polyol (pph) used in the in-situ gel-foam formulation. Increasing the loading of gel in gel-foam will generally increase the rate of change of support factor ($\Delta SF \propto dF/dC$, where SF=support factor, F=Compression Force and C=Compression Percentage).

TABLE 5

HIGHER COMPRESSION FORCE TESTING

| % Compression | 6051 lbf | 6052 lbf | 6053 Lbf | 6054 lbf |
|---|---|---|---|---|
| | | Units | | |
| 25% | 4.75 | 3.22 | 2.19 | 2.57 |
| 40% | 5.58 | 4.19 | 2.97 | 3.4 |
| 50% | 6.47 | 5 | 4.03 | 4.23 |
| 60% | 8.11 | 7.07 | 5.68 | 5.81 |
| 70% | 11.82 | 11.64 | 9.49 | 10.01 |
| 80% | 24.06 | 27.38 | 23.61 | 24.13 |
| 85% | 43.09 | 54 | 47.05 | 47.6 |
| 90% | 105.08 | 146.28 | 129.44 | 130.03 |

Improved Thermal Conductivity

Another advantage of the methods and compositions herein is an improvement in the thermal conductivity or heat transfer properties. Foams were tested in accordance with ASTM E1225—Standard test method for thermal conductivity of solids by means of the guarded-comparative-longitudinal heat flow technique. A 2-inch (5.1 cm) thick sample was compressed 75% to remove air pockets in the foam. The thermal conductivities for a non-gel foam sample (Sample 6051) and a gel-foam sample (Sample 6052) were 0.0226 Btu/(hr-ft-° F.) (0.0391 W/(m-° K)) and 0.0292 Btu/(hr-ft-° F.) (0.0505 W/(m-° K)), respectively. The gel foam sample (Sample 6052) showed a 29.2% improvement in thermal conductivity relative to the control non-gel sample (Sample 6051).

Improved Heat Storage Capacity

Open cell, flexible polyurethane foams produced with phase change gel materials will have a higher heat storage capacity than non-gel polyurethane foams. This property is important when the polyurethane foams with in-situ phase change gel are used in bedding products. Higher heat capacity in combination with higher thermal conductivity will transfer heat away from the contact surface between a person and the foam. The foam will thus have a cooler feel for a person in contact with the foam.

FIG. 6 shows the temperature change of foam sample #8304 (4.36 pcf (69.8 kg/m$^3$) density, 12.0 lb (16.2 J) (53.4 N) IFD) with phase change-containing gel. Foam sample #8304, weighing 0.1249 grams and approximate dimensions of 9 mm×13 mm×16 mm and thermocouple place in the center of sample, was heated in a container at 3.0° C./min—note the drop of the jagged curve as compared to the straight line. The heating curve showed a shift of 5.1° F. (2.8° C.) due to the cooling effect of phase change material when the phase change material changed from a solid to a liquid. The phase change material was able to maintain a cooler temperature foam by storing latent energy in the phase change material as the phase change material changed from a solid to a liquid.

Alternative Embodiments

In another non-limiting embodiment, a combination of phase change gel and polyurethane foam may be made by a method including polymerizing a polyol and an isocyanate to form a polyurethane foam as previously described. A copolymer resin such as a triblock copolymer resin and/or an diblock copolymer resin forming, and combinations thereof may be formed. The plasticized copolymer resin further comprises one or more phase change materials, which materials have been previously described. The copolymer resin may be at least partially crosslinked, but should be "molten" or in liquid form and thus should not be entirely crosslinked. The copolymer resin may be "molten" or in liquid form by heating or dissolving in a solvent. Suitable solvents include, but are not necessarily limited to, the following examples: saturated acyclic aliphatic hydrocarbons, unsaturated acyclic aliphatic hydrocarbons, saturated cyclic aliphatic hydrocarbons, unsaturated cyclic aliphatic hydrocarbons, aromatic hydrocarbons, chlorinated hydrocarbons, alcohols, glycol ethers, ketones, aldehydes, epoxides, carboxylic acids, esters, glycol ether esters, fatty acids, phosphite esters, phosphate esters, dimethylsulfoxide, dimethylformamide, hexamethylphosphorotriamide, furan, water, methylene chloride, toluene, acetone and combinations thereof. At least a portion of the copolymer resin is "infused" or pressed into the polyurethane foam. The copolymer resin is further at least partially crosslinked or completely crosslinked to form the finished product. In an alternative not limiting embodiment, the polyurethane foam is pressed onto a container containing a relatively shallow layer of the molten or liquid gel resin so that the molten or liquid gel resin penetrates into the open cells of the foam. Alternatively, the molten or liquid gel may be applied to the polyurethane foam using a roller coated with the molten or liquid gel. Alternatively, the liquid gel may be poured on a surface of foam or soaked into the foam and the foam/gel surface is compressed, which helps the liquid to migrate down into the foam and helps increase the porosity of the foam/gel layer. While the most common form produces a layer of the gel infused within the foam, the physical embodiment is not limited to a layer, but may have other physical configurations including, but not necessarily limited to, a core within a polyurethane foam, a regular or irregular pattern of regions within the polyurethane foam, and the like.

In a different non-limiting embodiment, the at least partially crosslinked copolymer resin containing one or more phase change materials is not evenly or homogenously distributed within the mixture of polyurethane foam forming components comprising a polyol and an isocyanate. If the at least partially crosslinked gel contains a dye, pigment or other colorant, the effect of such a uneven or non-homogeneous distribution may be a swirling effect within the combination or mixture of gelatinous elastomer and polyurethane foam. In another non-limiting alternative embodiment the colored gel is sprayed onto or into the form foaming components in such a way that the gel is not uniformly or homogeneously distributed. Other effects besides swirling may result by using different mixing techniques and effects. The mixture of the at least partially crosslinked copolymer resin or gel within the foam forming components may be understood as a liquid/liquid dispersion. If the liquid/liquid dispersion is uniform, the combination will have a uniform color. If the liquid/liquid dispersion is non-uniform or non-homogeneous, a different appearance will result, such as a swirled, marbled, mottled, striated spiral or whirled effect. In a particular specific embodiment of the liquid/liquid dispersion the at least partially crosslinked copolymer resin contains one or more of the phase change materials previously discussed.

Many modifications may be made in the methods of and implementation of this invention without departing from the spirit and scope thereof that are defined only in the appended claims. For example, the exact phase change materials or phase change additives, thermally-conductive material, triblock copolymer resin, diblock copolymer resin, gel particles, gel additives, polyols, isocyanates, catalysts and additives used may be different from those used explicitly mentioned or suggested here. Additionally, techniques and methods for improving the properties and/or processing characteristics of combinations of gelatinous elastomers and polyurethane foams other than those specifically mentioned may find utility in the methods herein. Various combinations of phase change materials or phase change additives, thermally-conductive material, triblock and/or diblock gelatinous elastomer resins, polyols, isocyanates, catalysts and additives, and processing pressures besides those explicitly mentioned herein are expected to be useful.

The words "comprising" and "comprises" as used throughout the claims is interpreted "including but not limited to".

The present invention may suitably comprise, consist or consist essentially of the elements disclosed and may be practiced in the absence of an element not disclosed. For instance, a composition consisting essentially of or consisting of a combination of phase change gel and open cell flexible polyurethane foam may be produced by the method consisting of or consisting essentially of crosslinking a copolymer resin selected from the group consisting of a triblock copolymer resin, a diblock copolymer resin, and combinations thereof, with one or more phase change materials; reducing the size of the cured gel into gel particles having an average particle size between the range of about 0.01 to 10 millimeters; introducing the gelled particles containing one or more phase change materials into a mixture of polyurethane foam forming components comprising a polyol and an isocyanate; and polymerizing the polyol and the isocyanate to form an open cell flexible polyurethane foam; where the gel particles are discrete visible particles in the open cell flexible polyurethane foam and where the phase change gel particles are present in the range of about 0.1 to about 200 parts per hundred parts of the polyol component of polyurethane foam.

Alternatively there may be provided a composition consisting essentially of or consisting of a combination of phase change gel and open cell flexible polyurethane foam consisting essentially of or consisting of cured phase change gel particles comprising, consisting essentially of or consisting of crosslinked plasticized copolymer resin containing one or more phase change materials, wherein the copolymer resin is selected from a group consisting of a triblock copolymer resin, a diblock copolymer resin, and combinations thereof, the phase change gel particles having an average particle size between the range of about 0.01 to 10 millimeters within an open cell flexible polyurethane foam.

In another non-limiting embodiment, there is provided a composition consisting essentially of or consisting of a combination of phase change gel and open cell flexible polyurethane foam consisting essentially of or consisting of cured phase change gel particles comprising, consisting essentially of or consisting of crosslinked plasticized copolymer resin selected from the group consisting of a triblock copolymer resin, a diblock copolymer resin, and combinations thereof, and one or more phase change materials, the phase change gel particles having an average particles size between the range of about 0.01 to 10 millimeters within an open cell flexible polyurethane foam; where the phase change gel particles are present in the range of about 0.1 to about 200 parts per hundred parts of the polyol component of open cell flexible polyurethane foam; where the gel particles are discrete visible particles in the open cell flexible polyurethane foam and where at least a portion of the cured phase change gel particles are at least partially melted within the open cell flexible polyurethane foam; and where the copolymer resin is a triblock copolymer resin selected from the group consisting of styrene-ethylene -butylene-styrene (SEBS), styrene-ethylene-propylene-styrene (SEPS), styrene -ethylene-ethylene-propylene-styrene (SEEPS), styrene-isoprene-styrene (SIS) and combinations thereof; and the elastomeric diblock copolymer, if present, is selected from the group consisting of styrene-ethylene-propylene (SEP), styrene-ethylene -butylene (SEB), styrene-ethylene-ethylene (SEE), styrene-isoprene (SI) and combinations thereof.

In a different non-restrictive version there is provided a composition consisting essentially of or consisting of a combination of phase change gel and latex foam consisting essentially of or consisting of cured phase change gel particles comprising, consisting essentially of, or consisting of crosslinked plasticized copolymer resin containing one or more phase change materials, wherein the copolymer resin is selected from a group consisting of a triblock copolymer resin, a diblock copolymer resin, and combinations thereof, the phase change gel particles having an average particle size between the range of about 0.01 to 10 millimeters within a latex foam; where the phase change gel particles are present in a range of about 0.1 to about 200 parts per hundred parts of the latex-forming component of latex foam and where the gel particles are discrete visible particles in the latex foam.

Finally in another non-limiting, alternative embodiment, there may be provided a composition consisting essentially of or consisting of phase change gel and latex foam consisting essentially of or consisting of cured phase change gel particles comprising, consisting essentially of, or consisting of crosslinked plasticized copolymer resin selected from the group consisting of a triblock copolymer resin, a diblock copolymer resin, and combinations thereof, and one or more phase change materials, the phase change gel particles having an average particle-size between the range of about 0.01 to 10 millimeters within a latex foam; where the phase change gel particles are present in the range of about 0.1 to about 200 parts per hundred parts of latex-forming component of latex foam; where the gel particles are discrete visible particles in the latex foam; where at least a portion of the cured phase change gel particles are at least partially melted within the latex foam; and where the copolymer resin is a triblock copolymer resin selected from the group consisting of styrene-ethylene-butylene-styrene (SEBS), styrene -ethylene-propylene-styrene (SEPS), styrene-ethylene-ethylene-propylene-styrene (SEEPS), styrene-isoprene-styrene (SIS) and combinations thereof; and the elastomeric diblock copolymer, if present, is selected from the group consisting of styrene-ethylene-propylene (SEP), styrene-ethylene-butylene (SEB), styrene-ethylene-ethylene (SEE), styrene-isoprene (SI) and combinations thereof.

What is claimed is:

1. A composition comprising a combination of gel particles containing phase change materials and open cell flexible polyurethane foam produced by a method comprising:
   a. crosslinking a plasticized copolymer resin selected from the group consisting of a triblock copolymer resin, a diblock copolymer resin, and combinations thereof, to give a cured gel, where the triblock copolymer resin is selected from the group consisting of styrene-ethylene-butylene-styrene (SEBS), styrene-ethylene-propylene-styrene (SEPS), styrene-ethylene-ethylene-propylene-styrene (SEEPS), and combinations thereof; and the diblock copolymer resin is selected from the group consisting of styrene-ethylene-propylene (SEP), styrene-ethylene-butylene (SEB), styrene-ethylene-ethylene (SEE), and combinations thereof;
   b. introducing one or more phase change materials in the plasticized copolymer resin while the plasticized copolymer resin is at least partially melted before the gel has cured, where the phase change material has a solid/liquid phase transition temperature range of about $-10°$ F. to about 220° F. (about $-23°$ C. to about 104° C.);
   c. reducing the size of the cured gel into gel particles containing phase change materials having an average particle size between the range of about 0.01 to about 10 millimeters;
   d. introducing the gel particles containing phase change materials into a mixture of polyurethane foam forming components comprising a polyol and an isocyanate; and
   e. polymerizing the polyol and the isocyanate to form an open cell flexible polyurethane foam;
   where the gel particles containing phase change materials are in the range of about 0.1 to about 200 parts per hundred parts of the polyol component of open cell flexible polyurethane foam.

2. The composition of claim 1 wherein the copolymer resin is at least partially melted by heat produced by polymerizing the polyol and the polyisocyanate to form the open cell flexible polyurethane foam.

3. The composition of claim 1 where the copolymer resin is a triblock copolymer resin and the copolymer resin is added in the range of about 0.1 to about 200 parts per hundred parts of the polyol component of open cell flexible polyurethane foam.

4. The composition of claim 1 where the copolymer resin is formed by compounding a copolymer with at least one plasticizer and a component selected from the group consisting of colorants, thermally-conductive materials, solvents, elastomeric diblock copolymers, antioxidants, antistatic agents, antimicrobial agents, flame retardants, ultraviolet stabilizers, surface tension modifiers, emulsifying agents, surfactants, fragrances, grafting polyether polyols, grafting polyester polyols, active hydrogen-containing components selected from the group consisting of primary amines, secondary amines and combinations thereof, solid fillers, liquid fillers, and combinations thereof.

5. The composition of claim 4 where the plasticizer is selected from the group consisting of a paraffinic mineral oil, naphthenic mineral oil, synthetic oil produced from polybutenes, polypropenes, polyterpenes, paraffins and isoparaffins, polyols, glycols, polyoxyalkyleneamines, soybean-based polyols, castor bean-based polyols, canola oil, safflower oil, sunflower oil, soybean oil, castor oil, coconut oil, DOP, DINP, a wax that changes from a liquid to a solid over the temperature range of expected use, and combinations thereof, and the plasticizer is present in the range of from about 1 to about 1400 parts per hundred of copolymer resin.

6. The composition of claim 1 where the phase change material is a liquid when the phase change material is in a relatively high energy state and a solid when the phase change material is in a relatively low energy state.

7. The composition of claim 1 where the phase change material is a solid when the phase change material is in a relatively high energy state and a solid when the phase change material is in a relatively low energy state.

8. The composition of claim 1 where the phase change material is selected from a group of glycerol, acetic acid, polyethylene glycol, crosslinked polyethylene glycol, camphene, oxazoline wax, d-lactic acid, formic acid, acrylic acid, p-xylene, caprylic acid, jojoba wax, cotton seed oil, coconut oil, rice oil, water, almond oil, beechnut oil, black mustard oil, candlenut oil, castor oil, corn oil, cotton seed stearin, esparto, poppy seed oil, rape seed oil, canola oil, pumpkin seed oil, beeswax, $NH_4Cl \cdot Na_2SO_4 \cdot 10H_2O$, $NaCl \cdot NH_4Cl \cdot 2NaSO_4 \cdot 20H_2O$, $NaCl \cdot Na_2SO_4 \cdot 10H_2O$, n-tetradecane, n-pentadecane, n-hexadecane, n-heptadecane, n-octadecane, n-nonadecane, n-eicosane, n-heneicosane, n-decosane, n-tricosane, trimethylolethane, neopentyl glycol, lithium chloride, calcium chloride hydrate, 1-decanol octadecane, C-16 to C-22 alkyl hydrocarbons, natural rubber, polychloropropene, crystalline alkyl hydrocarbons, pentaerythritol, polyhydric alcohols, acrylate and methyacrylate polymers, $CaBr_2 \cdot 6H_2O/NaCl$, $Na_2SO_4 \cdot 10H_2O/NaCl$, $CaCl_2 \cdot 6H_2O$, $Na_2SO_4 \cdot 10H_2O$, $CaBr_2 \cdot 6H_2O$, and combinations thereof.

9. The composition of claim 1 where the phase change material is encapsulated with a coating prior to introducing into the plasticized copolymer resin.

10. The composition of claim 1 where the phase change material has the form of a particle having a size less than 1000 microns.

11. The composition of claim 1 where the copolymer resin further comprises an inert carrier selected from the group consisting of non-polar carriers, polar carriers, polyether polyol carriers, isocyanate/polyether prepolymers, liquid or solid fillers, liquid or solid flame retardants, blowing agents, and combinations thereof.

12. The composition of claim 1 where the gel particles containing phase change materials have an average volume between about 0.001 and about 1000 $mm^3$.

13. The composition of claim 4 where the gel particles containing phase change materials contain one or more thermally-conductive materials.

14. The composition of claim 4 where the thermally-conductive material is a solid and has a thermal conductivity from 0.1 W/(m K to 2000 W/(m-° K).

15. The composition of claim 4 where the thermally-conductive material is selected from a group of talc, melamine, carbon black, graphite, aluminum oxide, aluminum nitride, zinc oxide, ferric oxide, diamond, titanium dioxide, magnesium oxide, silicon carbide, boron nitride, sodium carbonate, sodium bicarbonate, calcium carbonate, barium sulfate, metallic flakes, and combinations thereof.

16. An article of manufacture comprising the composition of claim 1, where the article is selected from the group consisting of rebond carpet pads, floor mats, bath mats, pet beds, shoe inserts, medical cushioning foams, mattresses, pillows, bedding products, seat cushions, seat backs, head rests, armrests, and combinations thereof.

17. An article of manufacture comprising the composition of claim 1 where the flexible polyurethane foam is selected from the group consisting of polyether polyurethane foam, high-resiliency polyether polyurethane foam, viscoelastic polyether polyurethane foam, polyester polyurethane foam, and combinations thereof.

18. The article of manufacture of claim 17 where the article of manufacture is produced employing a technique selected from the group consisting of free rise, molded, and combinations thereof.

19. An article of manufacture comprising a combination of phase change gel particles containing phase change materials and open cell flexible polyurethane foam of claim 1 wherein the combination of phase change gel and polyurethane foam is layered with at least one other material selected from the group consisting of:
   a. a flexible viscoelastic foam,
   b. a flexible resilient polyurethane foam;
   c. a flexible high resilient (HR) foam,
   d. a latex foam, and
   e. combinations thereof.

20. The article of manufacture of claim 17 selected from the group consisting of mattresses, bedding products, pillows, furniture cushioning, wheelchairs, medical cushioning pads, medical supports, sports equipment, transportation seating, and combinations thereof.

21. A composition comprising a combination of gel particles containing phase change materials and open cell flexible polyurethane foam comprising:
   a. cured gel particles containing phase change materials comprising crosslinked plasticized copolymer resin containing one or more phase change materials, wherein the copolymer resin is selected from a group consisting of a triblock copolymer resin, a diblock copolymer resin, and combinations thereof, the phase change gel particles having an average particle size between the range of about 0.01 to about 10 millimeters within an open cell flexible polyurethane foam, where the phase change material has a solid/liquid phase transition temperature range of about −10° F. to about 220° F. (about −23° C. to about 104° C.), and where the triblock copolymer resin is selected from the group consisting of styrene-ethylene-butylene-styrene (SEBS), styrene-ethylene-propylene-styrene (SEPS), styrene-ethylene-ethylene-propylene-styrene (SEEPS), and combinations thereof; and the diblock copolymer resin is selected from the group consisting of styrene-ethylene-propylene (SEP), styrene-ethylene-butylene (SEB), styrene-ethylene-ethylene (SEE), and combinations thereof;
   b. where the gel particles containing phase change materials are particles in the open cell flexible polyurethane foam and where the gel particles containing phase change materials are present in a range of about 0.1 to about 200 parts per hundred parts of the polyol component of open cell flexible polyurethane foam.

22. The composition of claim 21 wherein at least a portion of the cured gel particles containing phase change materials are at least partially melted within the open cell flexible polyurethane foam.

23. The composition of claim 21 where the copolymer resin is formed by compounding a copolymer with at least one plasticizer and a component selected from the group consisting of colorants, thermally-conductive materials, solvents, elastomeric diblock copolymers, antioxidants, antistatic agents, antimicrobial agents, flame retardants, ultraviolet stabilizers, surface tension modifiers, emulsifying agents, surfactants, fragrances, grafting polyether polyols, grafting polyester polyols, active hydrogen-containing components selected from the group consisting of primary amines, secondary amines and combinations thereof, solid fillers, liquid fillers, and combinations thereof.

24. The composition of claim 23 where the plasticizer is selected from the group consisting of a paraffinic mineral oil, naphthenic mineral oil, synthetic oil produced from polybutenes, polypropenes, polyterpenes, paraffins and isoparaffins, polyols, glycols, polyoxyalkyleneamines, soybean-based polyols, castor bean-based polyols, canola oil, safflower oil, sunflower oil, soybean oil, castor oil, coconut oil, DOP, DINP, a wax that changes from a liquid to a solid over the temperature range of expected use, and combinations thereof, and the plasticizer is present in the range of from about 1 to about 1400 parts per hundred of copolymer resin.

25. The composition of claim 21 where the phase change material is a liquid when the phase change material is in a relatively high energy state and a solid when the phase change material is in a relatively low energy state.

26. The composition of claim 21 where the phase change material is a solid when the phase change material is in a relatively high energy state and a solid when the phase change material is in a relatively low energy state.

27. The composition of claim 21 where the phase change material is selected from a group of glycerol, acetic acid, polyethylene glycol, crosslinked polyethylene glycol, camphene, oxazoline wax, d-lactic acid, formic acid, acrylic acid, p-xylene, caprylic acid, jojoba wax, cotton seed oil, coconut oil, rice oil, water, almond oil, beechnut oil, black mustard oil, candlenut oil, castor oil, corn oil, cotton seed stearin, esparto, poppy seed oil, rape seed oil, canola oil, pumpkin seed oil, beeswax, $NH_4Cl.Na_2SO_4.10H_2O$, $NaCl.NH_4Cl.2NaSO_4.20H_2O$, $NaCl.Na_2SO_4.10H_2O$, n-tetradecane, n-pentadecane, n-hexadecane, n-heptadecane, n-octadecane, n-nonadecane, n-eicosane, n-heneicosane, n-decosane, n-tricosane, trimethylolethane, neopentyl glycol, lithium chloride, calcium chloride hydrate, 1-decanol octadecane, C-16 to C-22 alkyl hydrocarbons, natural rubber, polychloropropene, crystalline alkyl hydrocarbons, pentaerythritol, polyhydric alcohols, acrylate and methyacrylate polymers, $CaBr_2.6H_2O$/ NaCl, $Na_2SO_4.10H_2O$/NaCl, $CaCl_2.6H_2O$, $Na_2SO_4.10H_2O$, $CaBr_2.6H_2O$, and combinations thereof.

28. The composition of claim 21 where the phase change material is encapsulated with a coating prior to incorporating into plasticized copolymer resin.

29. The composition of claim 21 where the phase change material has the form of a particle having a size less than 1000 microns.

30. The composition of claim 21 where the gel particles containing phase change materials further comprises an inert carrier selected from the group consisting of non-polar carriers, polar carriers, polyether polyol carriers, isocyanate/polyether prepolymers, liquid or solid fillers, liquid or solid flame retardants, blowing agents, and combinations thereof.

31. The composition of claim 21 where the gel particles containing phase change materials have an average volume between about 0.001 and about 1000 $mm^3$.

32. The composition of claim 23 where the gel particles containing phase change materials contain one or more thermally-conductive materials.

33. The composition of claim 23 where the thermally-conductive material is a solid and has a thermal conductivity from 0.1 W/(m K to 2000 W/(m-° K).

34. The composition of claim 23 where the thermally-conductive material is selected from a group of talc, melamine, carbon black, graphite, aluminum oxide, aluminum nitride, zinc oxide, ferric oxide, diamond, titanium dioxide, magnesium oxide, silicon carbide, boron nitride, sodium carbonate, sodium bicarbonate, calcium carbonate, barium sulfate, metallic flakes, and combinations thereof.

35. An article of manufacture comprising the composition of claim 21, where the article is selected from the group consisting of rebond carpet pads, floor mats, bath mats, pet beds, shoe inserts, medical cushioning foams, mattresses, pillows, bedding products, seat cushions, seat backs, head rests, armrests, and combinations thereof.

36. An article of manufacture comprising the composition of claim 21 where the flexible polyurethane foam is selected from the group consisting of polyether polyurethane foam, high-resiliency polyether polyurethane foam, viscoelastic polyether polyurethane foam, polyester polyurethane foam, and combinations thereof.

37. The article of manufacture of claim 36 where the article of manufacture is produced employing a technique selected from the group consisting of free rise, molded, and combinations thereof.

38. An article of manufacture comprising the composition of claim 21 wherein the combination of phase change gel particles containing phase change materials and polyurethane foam is layered with at least one other material selected from the group consisting of:
 a. a flexible viscoelastic foam,
 b. a flexible resilient polyurethane foam;
 c. a flexible high resilient (HR) foam,
 d. a latex foam, and
 e. combinations thereof.

39. The article of manufacture of claim 36 selected from the group consisting of mattresses, bedding products, pillows, furniture cushioning, wheelchairs, medical cushioning pads, medical supports, sports equipment, transportation seating, and combinations thereof.

40. A composition comprising a combination of gel particles containing phase change materials and open cell flexible polyurethane foam comprising:
 a. cured gel particles containing phase change materials comprising crosslinked plasticized copolymer resin selected from the group consisting of a triblock copolymer resin, a diblock copolymer resin, and combinations thereof, and one or more phase change materials, the phase change gel particles having an average particles size between the range of about 0.01 to about 10 millimeters within an open cell flexible polyurethane foam, where the phase change material has a solid/liquid phase transition temperature range of about −10° F. to about 220° F. (about −23° C. to about 104° C.);
 b. where the gel particles containing phase change materials are particles in the open cell flexible polyurethane foam and where the gel particles containing phase change materials are present in the range of about 0.1 to about 200 parts per hundred parts of the polyol component of open cell flexible polyurethane foam;
 c. where at least a portion of the cured gel particles containing phase change materials are at least partially melted within the open cell flexible polyurethane foam; and
 d. where the copolymer resin is a triblock copolymer resin selected from the group consisting of styrene-ethylene-butylene-styrene (SEBS), styrene-ethylene-propylene-styrene (SEPS), styrene-ethylene-ethylene-propylene-styrene (SEEPS), and combinations thereof; and the elastomeric diblock copolymer, if present, is selected from the group consisting of styrene-ethylene-propylene (SEP), styrene-ethylene-butylene (SEB), styrene-ethylene-ethylene (SEE), and combinations thereof.

41. A composition comprising a combination of gel particles containing phase change materials and latex foam comprising:
 a. cured gel particles containing phase change materials comprising crosslinked plasticized copolymer resin containing one or more phase change materials, wherein the copolymer resin is selected from a group consisting of a triblock copolymer resin, a diblock copolymer resin, and combinations thereof, the phase change gel particles having an average particle size between the range of about 0.01 to about 10 millimeters within a latex foam, where the phase change material has a solid/liquid phase transition temperature range of about −10° F. to about 220° F. (about −23° C. to about 104° C.), where the triblock copolymer resin is selected from the group consisting of styrene-ethylene-butylene-styrene (SEBS), styrene-ethylene-propylene-styrene (SEPS), styrene-ethylene-ethylene-propylene-styrene (SEEPS), and combinations thereof; and the diblock copolymer resin is selected from the group consisting of styrene-ethylene-propylene (SEP), styrene-ethylene-butylene (SEB), styrene-ethylene-ethylene (SEE), and combinations thereof;

b. where the gel particles containing phase change materials are particles in the latex foam and where the gel particles containing phase change materials are present in a range of about 0.1 to about 200 parts per hundred parts of the latex-forming component of latex foam.

42. A composition comprising a combination of gel particles containing phase change materials and latex foam comprising:

a. cured gel particles containing phase change materials comprising crosslinked plasticized copolymer resin selected from the group consisting of a triblock copolymer resin, a diblock copolymer resin, and combinations thereof, and one or more phase change materials, the phase change gel particles having an average particle-size between the range of about 0.01 to about 10 millimeters within a latex foam, where the phase change material has a solid/liquid phase transition temperature range of about −10° F. to about 220° F. (about −23° C. to about 104° C.);

b. where the gel particles containing phase change materials are particles in the latex foam and where the gel particles containing phase change materials are present in the range of about 0.1 to about 200 parts per hundred parts of latex-forming component of latex foam;

c. where at least a portion of the cured gel particles containing phase change materials are at least partially melted within the latex foam; and where the copolymer resin is a triblock copolymer resin selected from the group consisting of styrene-ethylene-butylene-styrene (SEBS), styrene-ethylene-propylene-styrene (SEPS), styrene-ethylene-ethylene-propylene-styrene (SEEPS), and combinations thereof; and the elastomeric diblock copolymer, if present, is selected from the group consisting of styrene-ethylene-propylene (SEP), styrene-ethylene-butylene (SEB), styrene-ethylene-ethylene (SEE), and combinations thereof.

* * * * *